US012725953B2

(12) United States Patent
Masaki

(10) Patent No.: US 12,725,953 B2
(45) Date of Patent: Sep. 1, 2026

(54) RIBBON CONDUCTOR CONNECTOR

(71) Applicant: HIROSE ELECTRIC CO., LTD., Kanagawa (JP)

(72) Inventor: Shingo Masaki, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 288 days.

(21) Appl. No.: 18/475,934

(22) Filed: Sep. 27, 2023

(65) Prior Publication Data

US 2024/0113459 A1 Apr. 4, 2024

(30) Foreign Application Priority Data

Sep. 29, 2022 (JP) ................................ 2022-155949

(51) Int. Cl.
*H01R 12/88* (2011.01)
*H01R 12/77* (2011.01)

(52) U.S. Cl.
CPC ........... *H01R 12/88* (2013.01); *H01R 12/774* (2013.01)

(58) Field of Classification Search
CPC .............................. H01R 12/88; H01R 12/774
USPC .......................................................... 439/260
See application file for complete search history.

(56) References Cited

U.S. PATENT DOCUMENTS 6,338,648 B1 * 1/2002 Miura .................... H01R 12/79 439/495
8,678,844 B2 * 3/2014 Yoshisuji ............. H01R 13/641 439/495
2006/0292910 A1 * 12/2006 Lee ........................ H01R 12/79 439/260
2007/0224848 A1 * 9/2007 Takashita ............... H01R 12/79 439/67
2011/0275238 A1 * 11/2011 Iijima .................... H01R 12/88 439/492
2017/0229809 A1 8/2017 Urai et al.
2021/0175651 A1 * 6/2021 Nagae .................... H01R 12/79
2023/0030550 A1 * 2/2023 Masaki ................ H01R 12/774

FOREIGN PATENT DOCUMENTS

JP 2017-143000 A 8/2017
JP 2021125762 * 7/2021

OTHER PUBLICATIONS

Taiwanese Office Action (TWOA) dated Feb. 6, 2026 for Taiwanese Patent Application No. 112129909; English machine translation.

* cited by examiner

*Primary Examiner* — Tulsidas C Patel
*Assistant Examiner* — Thaslimur Rahman
(74) *Attorney, Agent, or Firm* — RANKIN, HILL & CLARK LLP

(57) ABSTRACT

A reinforcement metal fitting of a ribbon conductor connector includes a held portion held in a housing on the front end side of the housing, an elongating portion elongating from the held portion to a front side, and elongating outside the housing, a regulating portion elongating downward from the elongating portion, and a fixing portion located below the regulating portion and fixed to a circuit board. The main body has a regulated portion located corresponding to the reinforcement metal fitting in a terminal arrangement direction. The regulated portion is located so as to be contactable with the regulating portion facing from the front when the movable member is at the closing position.

12 Claims, 8 Drawing Sheets

RIBBON CONDUCTOR CONNECTOR

CROSS-REFERENCE TO RELATED APPLICATION

This application claims priority from Japanese Patent Application No. 2022-155949 filed with the Japan Patent Office on Sep. 29, 2022, the entire content of which is hereby incorporated by reference.

BACKGROUND

1. Technical Field

An aspect of the present disclosure relates to a ribbon conductor connector.

2. Related Art

As a ribbon conductor connector to which a ribbon conductor is insertably and pullably connected, a connector described in JP-A-2017-143000, for example, is known. In this connector, a movable member (pressing member) movable between an opening position and a closing position is moved to the closing position to contact a plurality of terminals with a ribbon conductor with a contact pressure. The plurality of terminals provided on the connector of JP-A-2017-143000 is arranged in the width direction of the ribbon conductor as a terminal arrangement direction, and held in a housing. The terminals have a lower arm and an upper arm that elongate in the insert and pull-out direction (longitudinal direction) of the ribbon conductor and a coupler that couples the middle parts of the lower arm and the upper arm to each other. The upper arm has a press receiving arm located on the front side of the coupler (on the front side of the inserting direction of the ribbon conductor) and a contact arm located on the rear side of the coupler (on the front side of the pull-out direction of the ribbon conductor).

The movable member is rotatable between the closing position at which the movable member is in attitude in which the movable member elongates in the longitudinal direction when viewed from the terminal arrangement direction and the opening position at which the movable member is in attitude in which the movable member is erected in the vertical direction. The movable member has a pressing portion that presses the press receiving arm at a position corresponding to the terminal in the terminal arrangement direction. Specifically, the cross-sectional shape of the pressing portion at a right angle to the terminal arrangement direction forms a near ellipse, and the pressing portion is located right below the press receiving arm. When the movable member moves to the closing position, the pressing portion is in attitude in which the vertical direction is the longitudinal direction, and presses the press receiving arm from below. As a result, the press receiving arm is elastically deformed upward above and the contact arm is elastically deformed. The contacting portion provided at the rear end of the contact arm contacts the ribbon conductor with a contact pressure.

SUMMARY

A ribbon conductor connector includes: a housing formed with a receiver as a space opened rearward, the receiver being capable of receiving a ribbon conductor in a ribbon shape, the ribbon conductor being insertably and pullably connected to the ribbon conductor connector in a longitudinal direction; a plurality of terminals arranged in a width direction of the ribbon conductor as a terminal arrangement direction, the plurality of terminals being held in the housing; a reinforcement metal fitting disposed outside a terminal arrangement region in the terminal arrangement direction, the reinforcement metal fitting being held in the housing; and a movable member movable with rotation between an opening position at which insertion of the ribbon conductor to the receiver is permitted and a closing position at which a contact pressure of the terminal to the ribbon conductor is increased, in which the housing permits movement of the movable member on a front side of the receiver, the movable member has a main body elongating in the terminal arrangement direction and a cam located corresponding to the terminal in the terminal arrangement direction, the cam being in collaboration with the terminal, the plurality of terminals has an upper arm and a lower arm elongating along the longitudinal direction and a coupler that couples middle parts of the upper arm and the lower arm in the longitudinal direction, the upper arm has, on a front end side, a pressure-receiving portion that is capable of elastically deforming upward by receiving force from the cam when the movable member is at the closing position, and the upper arm has, on a rear end side, a pressing portion that is elastically deformed downward corresponding to elastic deformation of the pressure-receiving portion, the pressing portion pressing the ribbon conductor from above to increase a contact pressure of the ribbon conductor with the terminal, the reinforcement metal fitting has a held portion that is held on the housing on a front end side of the housing, the reinforcement metal fitting has an elongating portion elongating from the held portion to a front side, the elongating portion elongating outside the housing, and the reinforcement metal fitting has a fixing portion located below from the regulating portion, the fixing portion being fixed to a circuit board, the main body has a regulated portion located corresponding to the reinforcement metal fitting in the terminal arrangement direction, and the regulated portion is located so as to be contactable to the regulating portion facing from front when the movable member is at the closing position.

BRIEF DESCRIPTION OF DRAWINGS

FIG. 4A illustrates a state in which the ribbon conductor is inserted, and FIG. 4B illustrates a cross section of a state in which the ribbon conductor is connected;

FIG. 5A illustrates a cross section at a position of a first terminal, FIG. 5B illustrates a cross section at a position of a second signal terminal, FIG. 5C illustrates a cross section at a position of a lock metal fitting, and FIG. 5D illustrates a cross section at a position of a reinforcement metal fitting;

FIG. 7A illustrates a cross section at a position of the first terminal, FIG. 7B illustrates a cross section at a position of the second signal terminal, FIG. 7C illustrates a cross section at a position of the lock metal fitting, and FIG. 7D illustrates a cross section at a position of the reinforcement metal fitting; FIG. 8A illustrates a cross section at a position of the first terminal, FIG. 8B illustrates a cross section at a position of the second signal terminal, FIG. 8C illustrates a cross section at a position of the lock metal fitting, and FIG. 8D illustrates a cross section at a position of the reinforcement metal fitting.

DETAILED DESCRIPTION

Figure 1:
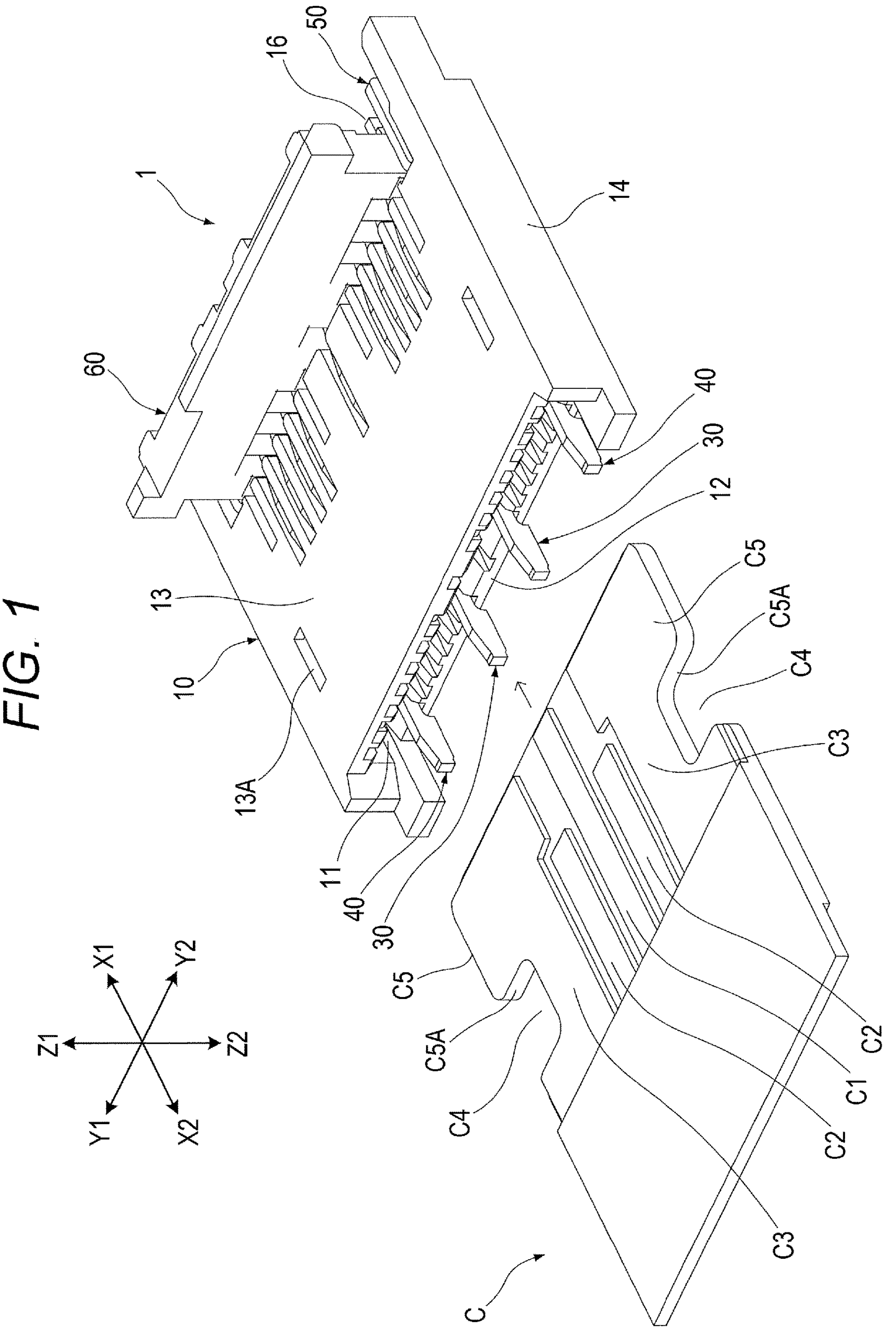
FIG. 1 is a perspective view illustrating a ribbon conductor connector according to an embodiment of the present disclosure together with a ribbon conductor, illustrating a state before the ribbon conductor is inserted in the ribbon conductor connector.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the connector described in JP-A-2017-143000 above, when the movable member is at the closing position, the pressing portion of the movable member maintains the state in which the press receiving arm of the terminal is lifted from below. At this time, the press receiving arm is in an inclined attitude in which the press receiving arm is inclined downward, as goes to the rear side. Supposing that when unprepared external force coming from the front acts on the movable member at the closing position, and the pressing portion of the movable member moves toward the rear side, which further pushes up the press receiving arm in the inclined attitude. In the case in which the external force is large, the press receiving arm is excessively deformed, and as a result, the press receiving arm is deformed, which might break the terminal.

An object of the present disclosure is to provide a ribbon conductor connector that is capable of suppressing the breakage of a terminal even though unprepared external force coming from the front acts on a movable member.

(1) A ribbon conductor connector according to an aspect of the present disclosure (present ribbon conductor connector) includes: a housing formed with a receiver as a space opened rearward, the receiver being capable of receiving a ribbon conductor in a ribbon shape, the ribbon conductor being insertably and pullably connected to the ribbon conductor connector in a longitudinal direction; a plurality of terminals arranged in a width direction of the ribbon conductor as a terminal arrangement direction, the plurality of terminals being held in the housing; a reinforcement metal fitting disposed outside a terminal arrangement region in the terminal arrangement direction, the reinforcement metal fitting being held in the housing; and a movable member movable with rotation between an opening position at which insertion of the ribbon conductor to the receiver is permitted and a closing position at which a contact pressure of the terminal to the ribbon conductor is increased.

In the ribbon conductor connector, the housing permits movement of the movable member on a front side of the receiver, the movable member has a main body elongating in the terminal arrangement direction and a cam located corresponding to the terminal in the terminal arrangement direction, the cam being in collaboration with the terminal, the plurality of terminals has an upper arm and a lower arm elongating along the longitudinal direction and a coupler that couples middle parts of the upper arm and the lower arm in the longitudinal direction, the upper arm has, on a front end side, a pressure-receiving portion that is capable of elastically deforming upward by receiving force from the cam when the movable member is at the closing position, and the upper arm has, on a rear end side, a pressing portion that is elastically deformed downward corresponding to elastic deformation of the pressure-receiving portion, the pressing portion pressing the ribbon conductor from above to increase a contact pressure of the ribbon conductor with the terminal, the reinforcement metal fitting has a held portion that is held on the housing on a front end side of the housing, the reinforcement metal fitting has an elongating portion elongating from the held portion to a front side, the elongating portion elongating outside the housing, and the reinforcement metal fitting has a fixing portion located below from the regulating portion, the fixing portion being fixed to a circuit board, the main body has a regulated portion located corresponding to the reinforcement metal fitting in the terminal arrangement direction, and the regulated portion is located so as to be contactable to the regulating portion facing from front when the movable member is at the closing position.

In the present ribbon conductor connector, a reinforcement metal fitting is provided outside the terminal arrangement region in the terminal arrangement direction. When the movable member is at the closing position, the regulated portion of the movable member is located such that the regulated portion is contactable to the regulating portion of the reinforcement metal fitting, facing from the front. Supposing that unprepared external force acts from the front on the movable member at the closing position, the regulated portion of the movable member contacts from the front to the regulating portion of the reinforcement metal fitting. Thus, the movement toward the rear side of the regulated portion is regulated. Consequently, it is possible to suppress the excess upward deformation of the pressure-receiving portion of the terminal by the cam of the movable member. As a result, the breakage of the terminal is suppressed.

(2) In the present ribbon conductor connector in (1), surfaces of the regulating portion and the regulated portion facing each other may form flat surfaces at a right angle in the longitudinal direction. Thus, when the movable member at the closing position receives unprepared external force from the front side and moves to the rear side, the regulating portion and the regulated portion surface-contact each other in the flat surfaces at the right angle to the pull-out direction of the ribbon conductor. As a result, the regulating portion and the regulated portion can contact each other in a larger area. Thus, it is possible to more excellently suppress a fall out of the ribbon conductor.

(3) In the present ribbon conductor connector in (1) or (2), the reinforcement metal fitting may have an arm elongating from the held portion to a rear side, and the arm may be formed such that the arm is elastically vertically deformed to be able to press the ribbon conductor from above. As described above, the arm is provided on the reinforcement metal fitting, the arm can press the ribbon conductor from above, and thus the reinforcement metal fitting can be involved in the connection state of the ribbon conductor to the connector. As described above, even though the reinforcement metal fitting is provided with the arm that is capable of elastically deforming, the regulating portion is provided on the front side of the held portion held and fixed to the housing, i.e., the regulating portion is provided on the opposite side of the arm in the longitudinal direction. Therefore, even though the regulated portion of the movable member moved on the rear side contacts the regulating portion from the front, the state of the elastically deformed arm is hardly affected. As a result, it is possible to excellently maintain the contact state of the arm with the ribbon conductor.

(4) In the present ribbon conductor connector (3), the arm may be formed such that the arm is contactable with a circuit of the ribbon conductor. Thus, it is possible to use the reinforcement metal fitting for the electrical connection of the present ribbon conductor connector to the ribbon conductor.

(5) In the present ribbon conductor connector in (1) to (4), a recess opened upward and forward may be formed at a position corresponding to the reinforcement metal fitting in the terminal arrangement direction in a front part of the housing, the movable member may have a shaft that is housed in the recess at a position corresponding to the reinforcement metal fitting in the terminal arrangement direction, and the shaft may be located below the elongating portion and on a rear side of the regulating portion. Thus, the shaft of the movable member is in a state in which the shaft is surrounded from four sides by the recess of the inner surface of the housing and the elongating portion and the regulating portion of the reinforcement metal fitting when viewed from the terminal arrangement direction. Therefore, since the movement of the shaft can be regulated in the vertical direction and the longitudinal direction, it is possible to excellently suppress the unprepared removal of the movable member from the housing.

In the present ribbon conductor connector, it is possible to provide a ribbon conductor connector that is capable of suppressing the breakage of the terminal even though unprepared external force from the front acts on the movable member.

In the following, an embodiment of the present disclosure will be described with reference to the accompanying drawings.

Figure 2:
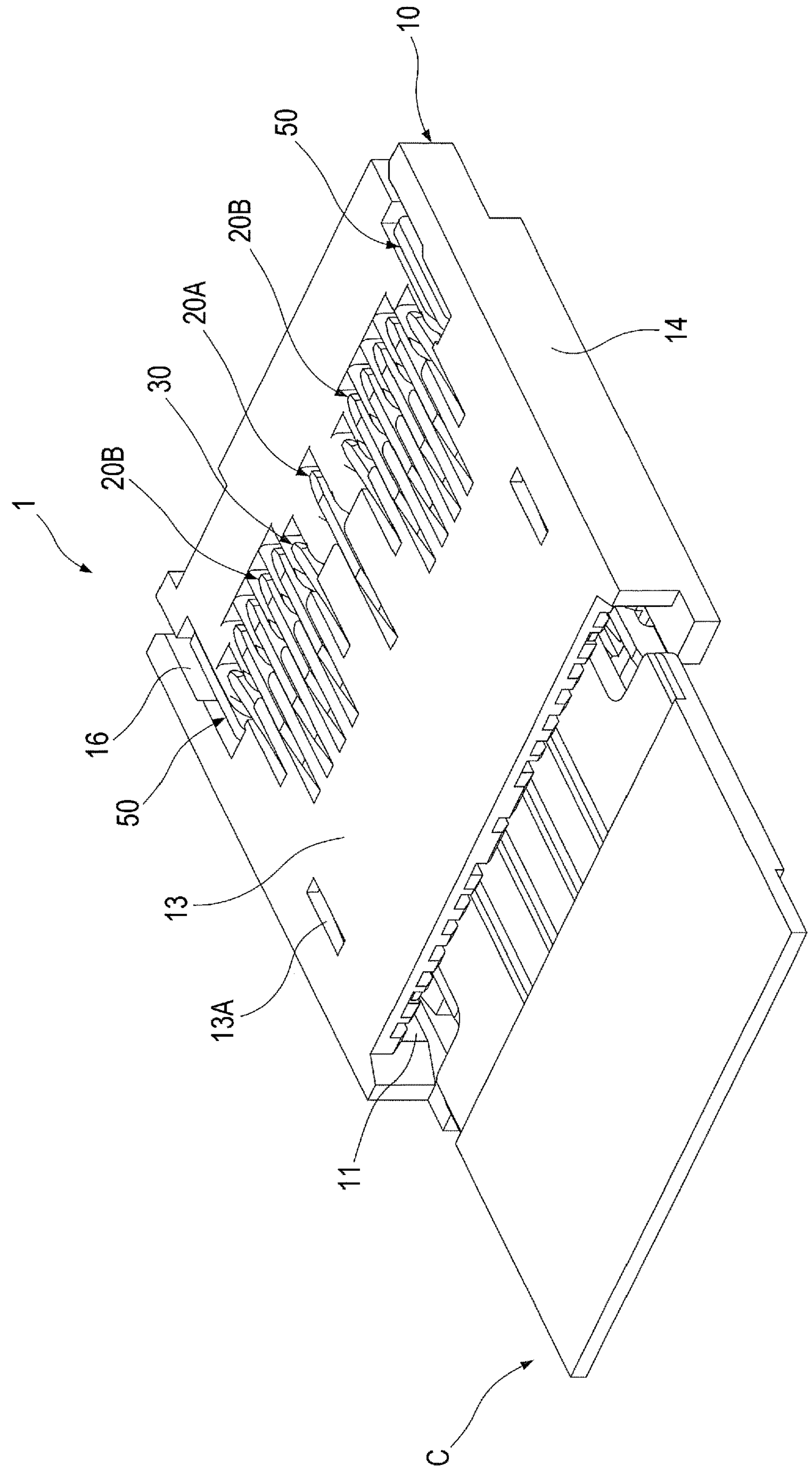
FIG. 2 is a perspective view illustrating the ribbon conductor connector in FIG. 1 together with the ribbon conductor, illustrating a state in which the ribbon conductor is connected in the ribbon conductor connector.
Figure 3:
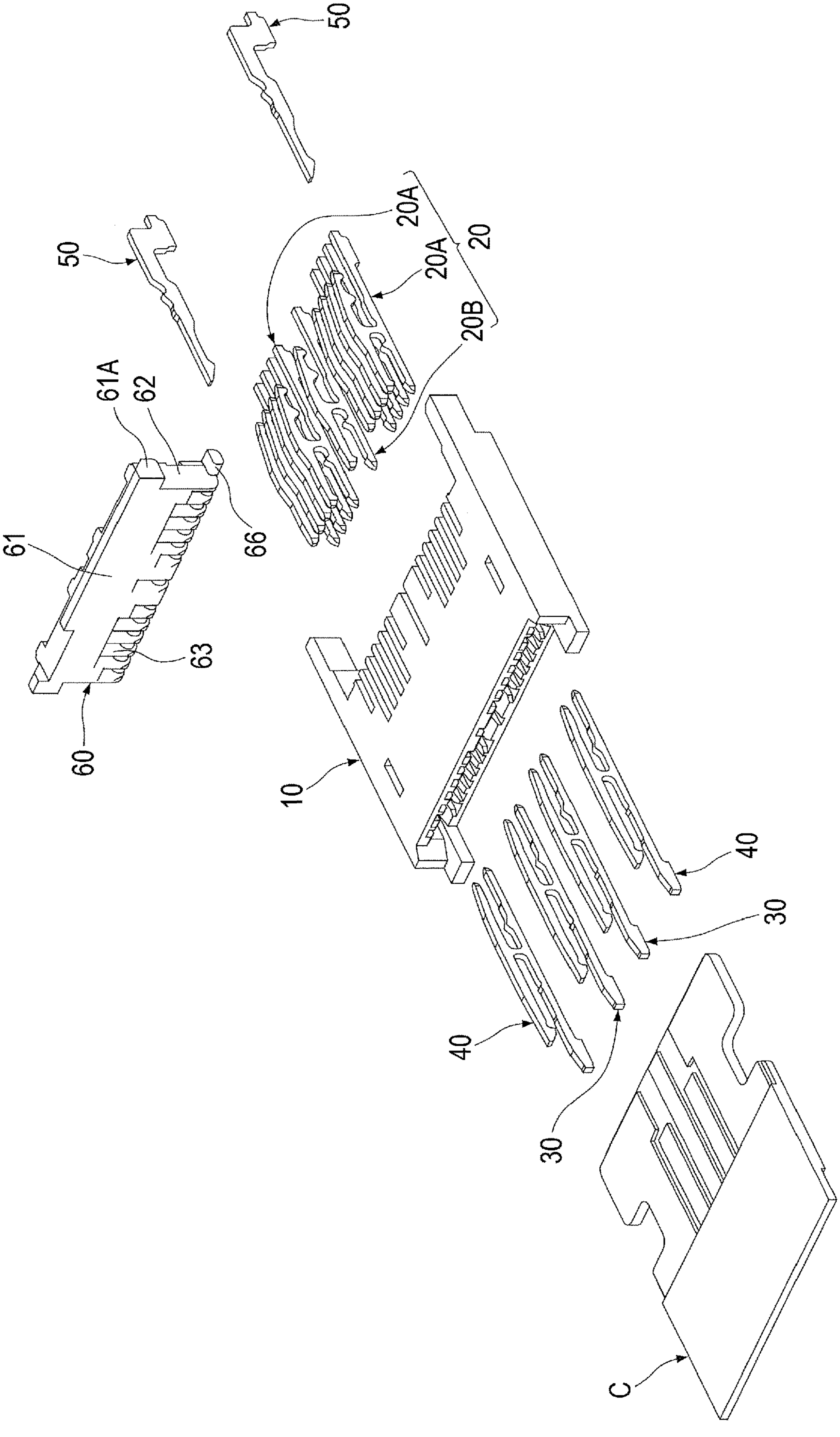
FIG. 3 is a perspective view illustrating a state in which the members of the ribbon conductor connector in FIG. 1 are separated.

FIGS. 1 and 2 are perspective views illustrating a ribbon conductor connector according to the embodiment of the present disclosure (in the following, referred to as "a connector 1") together with a ribbon conductor C. FIG. 1 illustrates a state before the ribbon conductor C is inserted in the connector 1. FIG. 2 illustrates a state in which the ribbon conductor C is connected in the connector 1. FIG. 3 is a perspective view illustrating a state in which the members of the connector 1 are separated.

The connector 1 is mounted on the mounting surface of a circuit board (not illustrated). The connector 1 is formed such that the ribbon conductor C (e.g. FPC) that is a counterpart connection item is insertably and pullably connected to the connector 1 as the longitudinal direction (in the X-axis direction) parallel to the mounting surface is the insert and pull-out directions. the ribbon conductor C is connected to the connector 1, and the connector 1 electrically conducts the circuit board to the ribbon conductor C.

In the present embodiment, in regard to the X-axis direction (longitudinal direction), an X1 direction is the front, and an X2 direction is the rear side. A Y-axis direction forming a right angle to the longitudinal direction (X-axis direction) in. a plan (XY-plane) parallel with the mounting surface of the circuit board is a connector width direction. A Z-axis direction at a right angle to the mounting surface of the circuit board is a vertical direction (a Z1 direction is upward, and a Z2 direction is downward).

The ribbon conductor C is a ribbon conductor in a ribbon shape insertably and pullably connected to the connector 1 in the longitudinal direction. The ribbon conductor C elongates in the longitudinal direction (X-axis direction), and has a flexible ribbon shape as the connector width direction (Y-axis direction) is the width direction. In the ribbon conductor C, a plurality of circuits elongating in the longitudinal direction is formed being arranged in the connector width direction. The circuit is embedded in the insulating layer of the ribbon conductor C except the front end side portion. The front end side portion of the circuit is exposed on the top surface of the ribbon conductor C, and is formed as a pad. In the present embodiment, these pads include a first signal pad C1 contactable to a first signal terminal 20A, described later, a second signal pad C2 contactable to a second signal terminal 30, described later, and a power supply pad C3 contactable to a power supply terminal 20B and a reinforcement metal fitting 50, described later.

As illustrated in FIG. 1, the first signal pad C1 is provided in the middle of the ribbon conductor C in the width direction (Y-axis direction). The second signal pad C2 is each provided on both sides of the first signal pad C1 in the width direction of the ribbon conductor C, and located between the first signal pad C1 and the power supply pad C3. The second signal pad C2 is formed to have the same width dimension (dimensions in the Y-axis direction) as the first signal pad C1. The power supply pad C3 is each provided at both end portions of the ribbon conductor C in the width direction. The power supply pad C3 extends to the lateral end position of the ribbon conductor C in the width direction, and is formed to have a width dimension larger than the first signal pad C1 and the second signal pad C2. The numbers and positions of the signal pads C1 and C2 provided between the power supply pads C3 at both ends are not limited to the numbers and positions described above, are appropriately set corresponding to the numbers and positions of the signal terminals 20A and 30 provided on the connector 1.

Figure 4B:
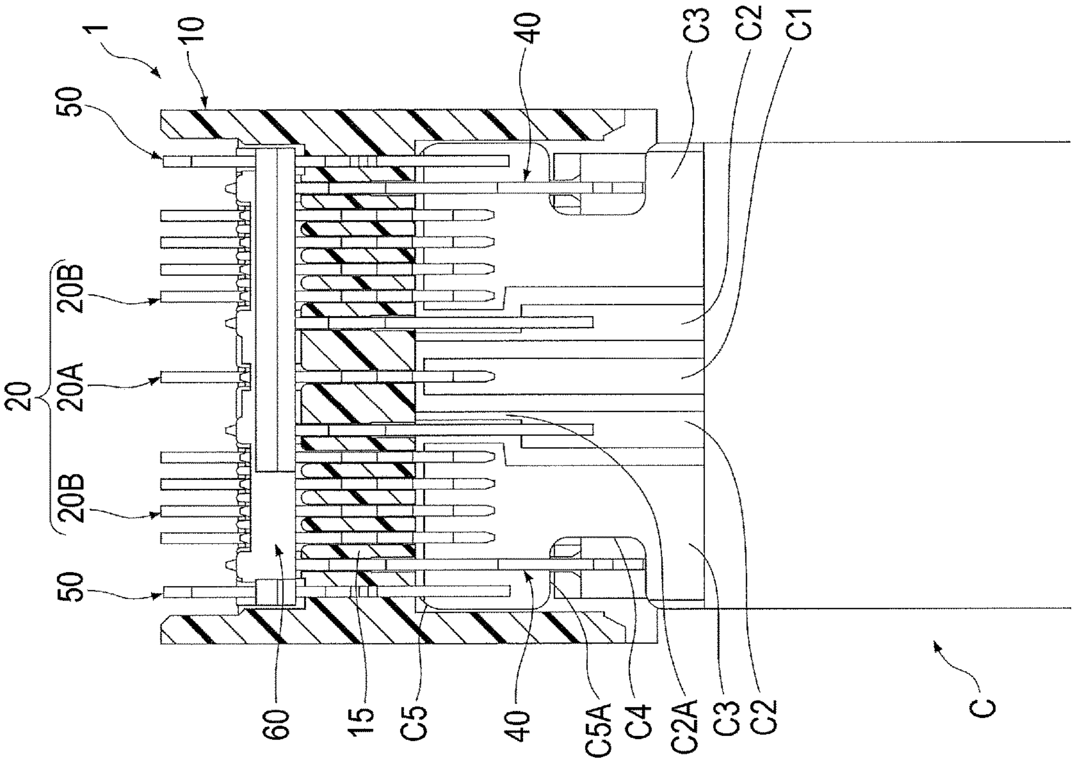
FIGS. 4A and 4B are lateral cross-sectional views of the ribbon conductor connector.
Figure 4A:
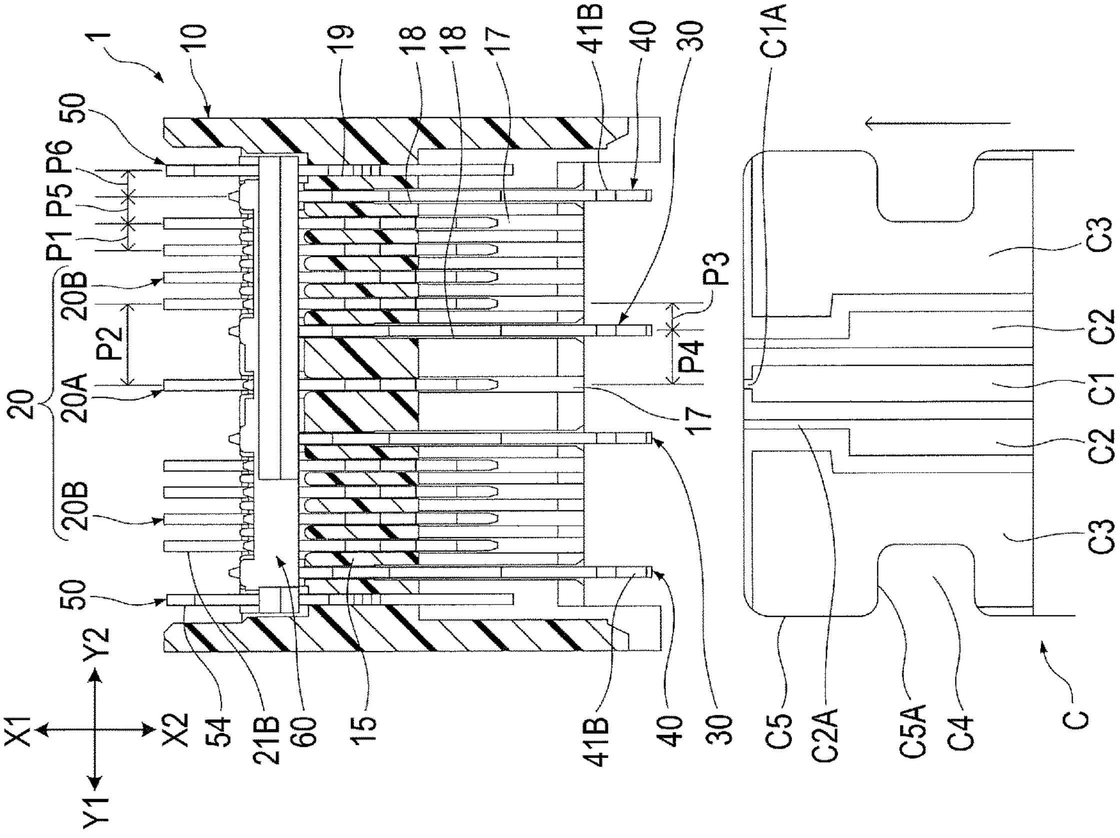

Although not illustrated in FIG. 1, as illustrated in FIGS. 4A and 4B, plating leads C1A and C2A are formed straight forward, elongating to reach the front end of the ribbon conductor C from the front ends of the signal pads C1 and C2, respectively. As illustrated in FIG. 4A, the plating lead C1A elongating from the front end of the first signal pad C1 is narrower than the first signal pad C1 in the width direction of the ribbon conductor C (in the Y-axis direction). The plating lead C1A is formed at the center position on the top surface of the ribbon conductor C in the width direction. As illustrated in FIGS. 4A and 4B, the plating lead C2A elongating from the front end of the second signal pad C2 is narrower than the second signal pad C2, in the width direction of the ribbon conductor C (in the Y-axis direction). The plating lead C2A is formed at a position close to the inner side end of the second signal pad C2 on the top surface of the ribbon conductor C in the width direction. The front ends of the power supply pads C3 reach near the front end of the ribbon conductor C. The front end of the second signal pad C2 is located on the rear side of the front ends of the first signal pad C1 and the power supply pads C3. In the power supply pad C3, the front end side portion that is located on the front side of the second signal pad C2 partially projects inward in the width direction of the ribbon conductor C, and the power supply pad C3 is formed to have a region overlapping the second signal pad C2 in the width direction (also referred to FIG. 4A).

At the front end side portion of the ribbon conductor C, a notch C4 is formed at both end portions in the width direction. The notch C4 is capable of receiving a lock portion 42B-1 of the lock metal fitting 40, described later, provided on the connector 1. The notch C4 is formed within the region of the power supply pad C3 and on the rear side of the front end of the second signal pad C2 in the longitudinal direction. The ribbon conductor C has a tab C5 in front of the notch C4. The rear end of the tab C5 forms a retained portion C5A that is capable of retaining the lock portion 42B-1, described above.

As described above, in the ribbon conductor C of the present embodiment, the front end side portion of the power supply pad C3 is partially formed to have a region overlapping the second signal pad C2 in the width direction. Therefore, even though the power supply terminal 20B and the second signal terminal 30 adjacent to each other in the connector 1 are disposed extremely close to each other in the width direction (terminal arrangement direction) in order to meet a request for a narrower pitch between the terminals, it is possible to sufficiently ensure the sizes of the power supply pad C3 and the second signal pad C2 of the ribbon conductor C in the width direction. In the ribbon conductor C, the notch C4 is formed on the rear side of the front end of the second signal pad C2. In other words, no notch C4 is present in the front end side portion of the power supply pad C3. Consequently, it is possible to sufficiently ensure the size of the size of the front end side portion of the power supply pad C3 in the width direction.

As illustrated in FIG. 1 to FIG. 3, the connector 1 has a housing 10 that receives the ribbon conductor C from the rear side, a plurality of terminals 20 and a plurality of terminals 30 (first terminals 20 and second signal terminals 30, described later) arranged in the connector width direction (in the Y-axis direction), which is the width direction of the ribbon conductor, as the terminal arrangement direction and held in the housing 10, the lock metal fitting 40 disposed outside the terminal arrangement regions of the plurality of terminals 20 and the plurality of terminals 30 and held in the housing 10, the reinforcement metal fitting 50 disposed outside the lock metal fitting 40 and held in the housing 10, and a movable member 60 that is movable rotation with rotation between an opening position at which insertion of the ribbon conductor C to a receiver 11 of the housing 10 is permitted and a closing position at which the contact pressure of the terminals 20 and 30 and the reinforcement metal fitting 50 to the ribbon conductor C is increased.

The plurality of terminals 20 and the plurality of terminals 30 have a plurality of first terminals 20 and a plurality of second signal terminals 30 as second terminals in different shapes. The first terminal 20 is a terminal that is solder-connected to the circuit board on the front side (on the X1 side) to the housing 10. The second signal terminal 30 is a terminal that is solder-connected to the circuit board on the rear side (on the X2 side) to the housing 10. FIGS. 4A and 4B are lateral cross-sectional views of the connector 1, i.e., cross-sectional views taken on the surface at a right angle to the vertical direction. FIG. 4A illustrates a cross section of a state before the ribbon conductor C is inserted. FIG. 4B illustrates a cross section of a state in which the ribbon conductor C is connected. As illustrated in FIGS. 4A and 4B, in the present embodiment, nine first terminals 20 and two second signal terminals 30 are provided in the housing 10.

Nine first terminals 20 have a first signal terminal 20A and eight power supply terminals 20B. The first signal terminal 20A is disposed in the center of the housing 10 in the connector width direction. The power supply terminals 20B are disposed four each on both sides of the first signal terminal 20A (on the Y1 side and the Y2 side) in the connector width direction. Four power supply terminals 20B sequentially arranged at a predetermined pitch P1 form a terminal group (in the following, referred to as "a power supply terminal group"). In other words, nine first terminals 20 have a first signal terminal 20A and two power supply terminal groups. In the four power supply terminals 20B belonging to each of the power supply terminal groups, a gap P2 greater than the predetermined pitch P1 is formed between a specific power supply terminal 20B arranged on the innermost side in the connector width direction (in the following, referred as "the inner power supply terminal 20B") and the first signal terminal 20A.

As illustrated in FIGS. 4A and 4B, the second signal terminal 30 is provided one each at a position between the first signal terminal 20A and the power supply terminal group on the Y1 side in the connector width direction and at a position between the first signal terminal 20A and the power supply terminal group on the Y2 side in the connector width direction. As illustrated in FIG. 4A, the second signal terminal 30 is disposed such that the second signal terminal 30 continues at a predetermined pitch P3 at a position close to the power supply terminal group to the inner power supply terminal 20B of the power supply terminal group (the second signal terminal 30 separates from the inner power supply terminal 20B by the pitch P3). In the present embodiment, this pitch P3 is equal to the pitch P1 between the power supply terminals 20B. A gap P4 between the second signal terminal 30 and the first signal terminal 20A is greater than the pitch P3. The relationship between the sizes of the pitch P1, the pitch P3, and the gap P4 are not limited to the relationship between the sizes described above, and is appropriately set suitable for design requests.

As illustrated in FIG. 4A, the lock metal fitting 40 is disposed such that the lock metal fitting 40 continues at a predetermined pitch P5 that is equal to the pitch P1 to the power supply terminal 20B (in the following, as necessary, referred to as "the outer power supply terminal 20B") located on the outermost position in the connector width direction in the power supply terminals 20B belonging to the power supply terminal group (the lock metal fitting 40 separates from the outer power supply terminal 20B by the pitch P5).

The reinforcement metal fitting 50 is disposed outside the terminal arrangement region in the terminal arrangement direction of the plurality of terminals 20 and the plurality of terminals 30, and held in the housing 10. As illustrated in FIG. 4A, the reinforcement metal fitting 50 is disposed such that the reinforcement metal fitting 50 continues at a predetermined pitch P6 that is equal to the pitch P1 to the lock metal fitting 40 in the connector width direction (the reinforcement metal fitting 50 separates from the lock metal fitting 40 by the pitch P6). The relationship between the sizes of the pitch P1, the pitch P5, and the pitch P6 is not limited to the relationship between the sizes described above, and is appropriately set suitable for design requests.

The housing 10 is an electrically insulating material made of a resin and the like. As illustrated in FIG. 1 to FIG. 3, the housing 10 has an outer shape in a nearly rectangular parallelepiped in which the connector width direction is the longitudinal direction. The housing 10 is formed with the receiver 11 that receives the ribbon conductor C as a space opening rearward. That is, the housing 10 is formed with the receiver 11 that is a space opened rearward, into which the ribbon conductor C is insertable. The housing 10 permits the movement of the movable member 60 on the front side of the receiver 11. The housing 10 has a lower wall 12 and an upper wall 13 elongating in parallel with the mounting surface of the circuit board (not illustrated), two side walls 14, and a front wall 15 (see FIG. 4A to D). The two side walls 14 elongate in the vertical direction, and couple both end portions of the lower wall 12 and the upper wall 13 in the connector width direction. The front wall 15 couples the lower wall 12 to the upper wall 13 at a position close to the front end of the housing 10. between the two side walls 14 on the front side of the front wall 15 in the connector width direction, a movable member housing space 16 that houses the movable member 60 and permits the movement of the movable member 60 is formed.

Figure 5A:
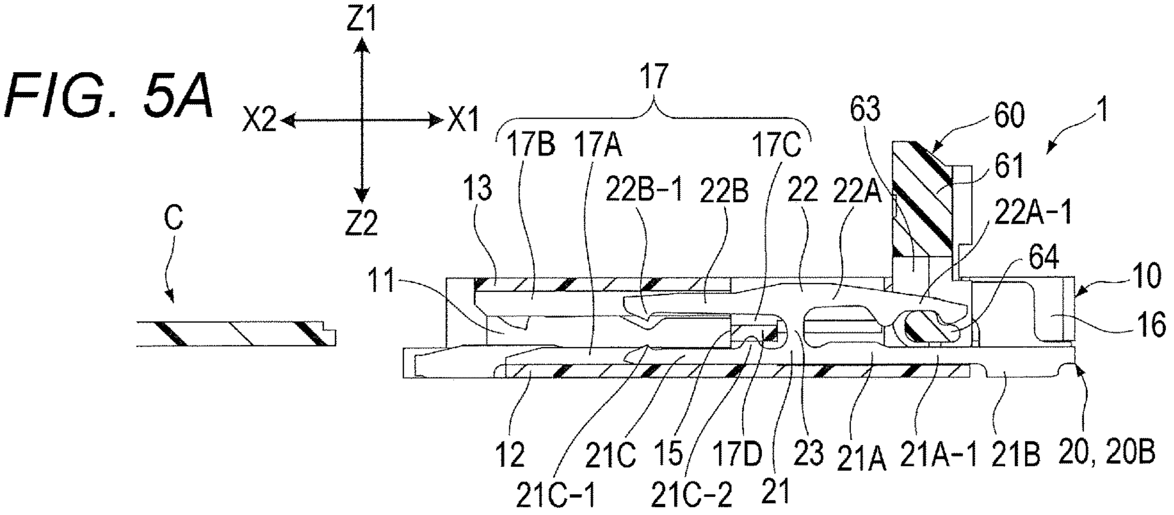
FIGS. 5A to 5D are longitudinal cross-sectional views of the ribbon conductor connector before ribbon conductor is inserted.
Figure 5B:
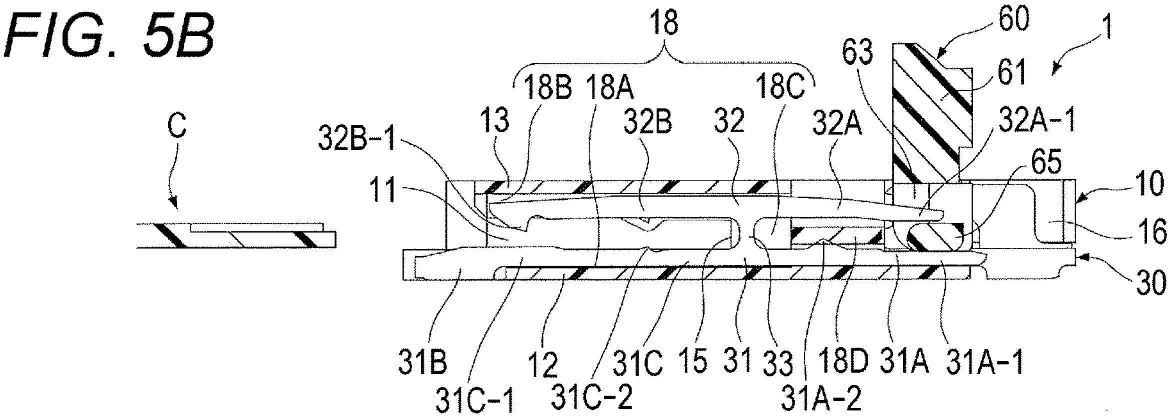
Figure 5C:
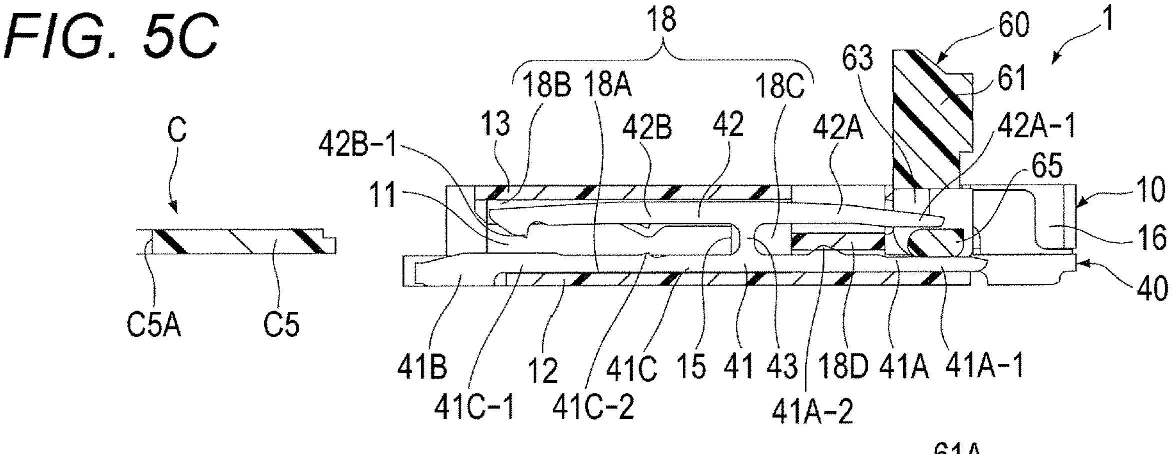
Figure 5D:
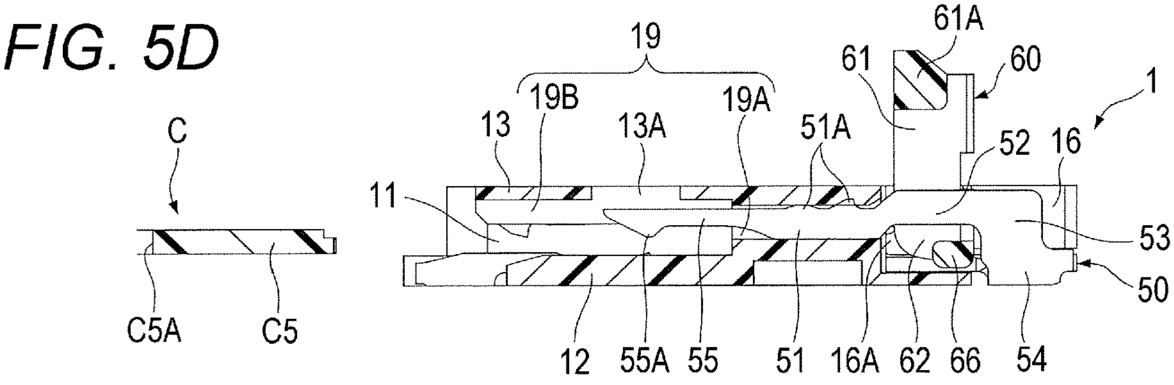

FIGS. 5A to 5D are longitudinal cross-sectional views of the connector 1 before the ribbon conductor C is inserted. FIG. 5A illustrates a cross section at the position of the first terminal 20. FIG. 5B illustrates a cross section at the position of the second signal terminal 30. FIG. 5C illustrates a cross section at the position of the lock metal fitting 40. FIG. 5D illustrates a cross section at the position of the reinforcement metal fitting 50. Here, FIG. 5A illustrates a cross section at the position of the power supply terminal 20B, and a cross section at the position of the first signal terminal 20A is similar to a cross section illustrated in FIG. 5A.

The lower wall 12 faces the mounting surface of the circuit board at a position below the upper wall 13. In the region of the receiver 11 in the connector width direction (in the Y-axis direction), the rear end of the lower wall 12 is located slightly on the front side of the rear ends of the upper wall 13 and the side wall 14 (see FIG. 1), and the front end part of the lower wall 12 elongates to the front side from the upper wall 13, and is located in the movable member housing space 16 (see FIGS. 5A to 5D).

As illustrated in FIGS. 5A to 5D, the housing 10 is formed with a first housing part 17 that houses and holds the first terminal 20, a second housing part 18 that houses and holds the second signal terminal 30 or the lock metal fitting 40, and a third housing part 19 that houses and holds the reinforcement metal fitting 50, which are formed to have a groove shape elongating in the longitudinal direction.

As illustrated in FIG. 5A, the first housing part 17 has a first lower groove 17A elongating in the longitudinal direction along the top surface of the lower wall 12, a first upper groove 17B elongating in the longitudinal direction along the under surface of the upper wall 13, and a first middle groove 17C vertically elongating to communicate the first lower groove 17A with the first upper groove 17B.

The first lower groove 17A is a groove that elongates in the entire region of the lower wall 12 in the longitudinal direction and opens upward. The first upper groove 17B is a groove that elongates in the entire region of the upper wall 13 in the longitudinal direction and opens downward. The first upper groove 17B vertically penetrates the upper wall 13 in the region corresponding to the front wall 15 in the longitudinal direction and opens upward as well. The first middle groove 17C is formed so as to penetrate the front wall 15 in the longitudinal direction. In the rear part of the first middle groove 17C, a first holding portion 17D is formed in an island shape viewed in the connector width direction. The first holding portion 17D couples inner wall surfaces (surfaces at a right angle to the connector width direction) that are opposed to each other in the connector width direction and form the first middle groove 17C.

As illustrated in FIG. 5B and FIG. 5C, the second housing part 18 has a second lower groove 18A elongating in the longitudinal direction along the top surface of the lower wall 12, a second upper groove 18B elongating in the longitudinal direction along the under surface of the upper wall 13, and a second middle groove 18C vertically elongating to communicate the second lower groove 18A with the second upper groove 18B.

The second lower groove 18A is a groove that elongates in the entire region of the lower wall 12 in the longitudinal direction and opens upward. The second upper groove 18B is a groove that elongates in the entire region of the upper wall 13 in the longitudinal direction and opens downward. The second upper groove 18B vertically penetrates the upper wall 13 in a region corresponding to the front part of the front wall 15 in the longitudinal direction, and opens upward as well. The second middle groove 18C is formed to penetrate the front wall 15 in the longitudinal direction. In the second middle groove 18C, a second holding portion 18D is formed in an island shape when viewed in the connector width direction. The second holding portion 18D couples inner wall surfaces (surfaces at a right angle to the connector width direction) to each other that are opposed to each other in the connector width direction and form the second middle groove 18C. The second holding portion 18D is provided on the front side of the first holding portion 17D.

As illustrated in FIG. 5D, the third housing part 19 has a front hole 19A penetrating the upper part of the front wall 15 in the longitudinal direction, and a third upper groove 19B elongating in the longitudinal direction along the upper wall 13. The front hole 19A is formed on the upper part of the front wall 15, and communicates with the third upper groove 19B. The third upper groove 19B is a groove that elongates in the entire region of the receiver 11 in the longitudinal direction and opens downward. The third upper groove 19B vertically penetrates the upper wall 13 at a middle position in the longitudinal direction. The upper wall 13 is formed with an upper opening 13A.

As illustrated in FIG. 5D, a recess 16A that is opened upward and forward on the front side of the front wall 15 is formed at a position corresponding to the third housing part 19, i.e., at a position corresponding to the reinforcement metal fitting 50 in the connector width direction. The recess 16A is a part of the movable member housing space 16, and houses a third shaft 66 of the movable member 60, described later. As described above, the recess 16A that is opened upward and forward is formed at the position corresponding to the reinforcement metal fitting 50 on the front part of the housing 10 in the terminal arrangement direction. The movable member 60 has the third shaft 66 that is a shaft housed in the recess 16A at the position corresponding to the reinforcement metal fitting 50 in the terminal arrangement direction.

Figure 6A:
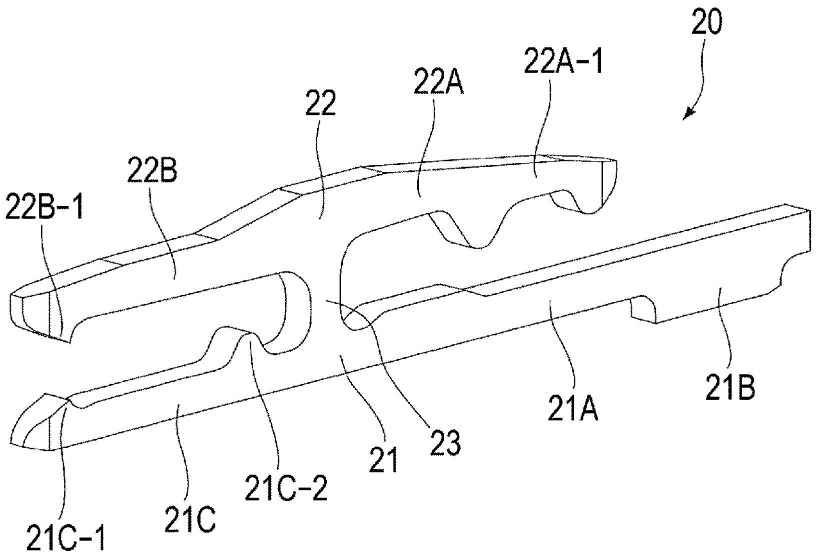
FIG. 6A is a perspective view illustrating the first terminal as a separate item.
Figure 6B:
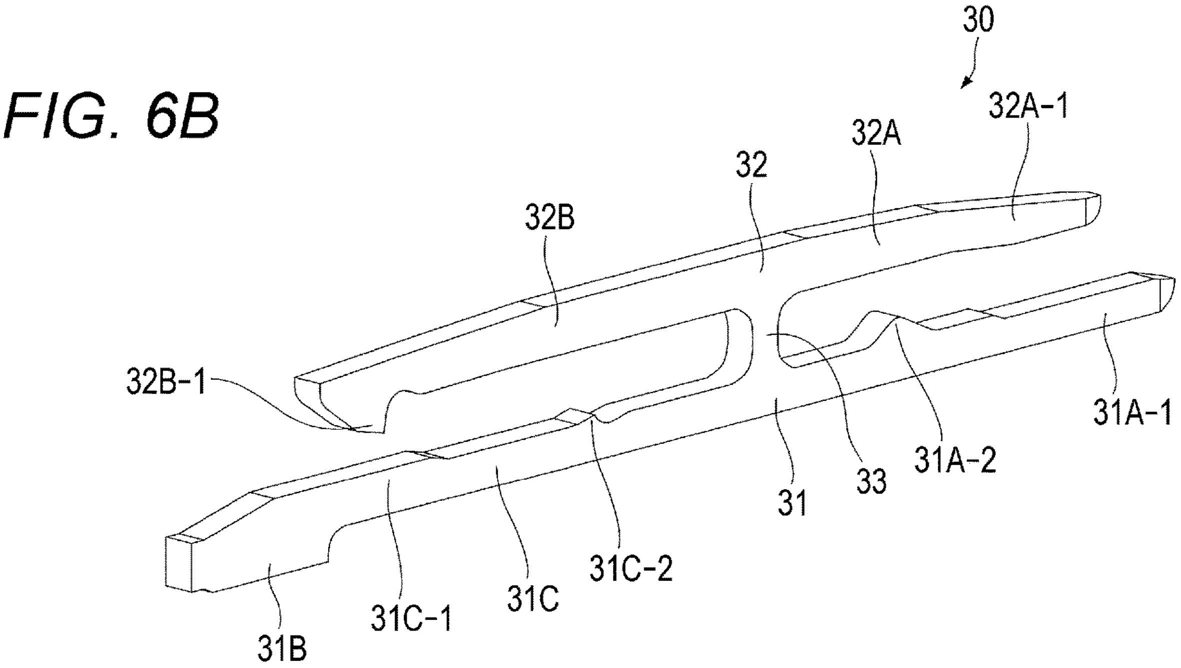
FIG. 6B is a perspective view illustrating the second signal terminal as a separate item.
Figure 6C:
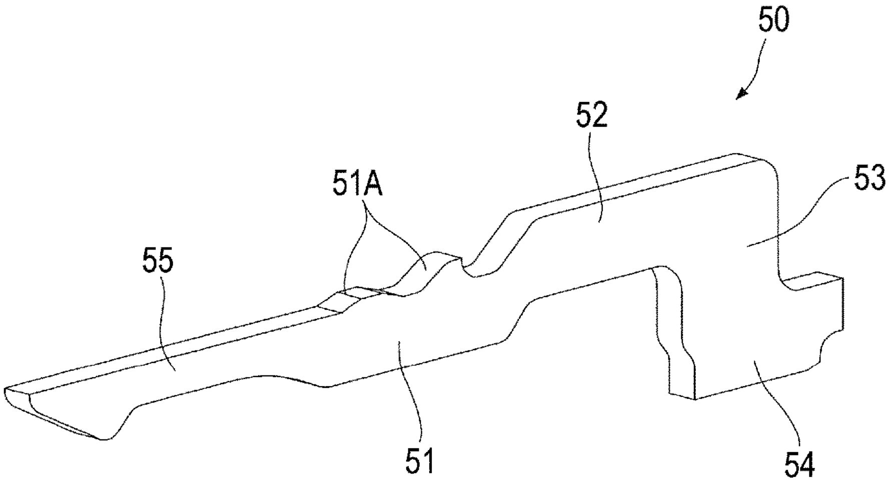
FIG. 6C is a perspective view illustrating the reinforcement metal fitting as a separate item.

FIG. 6A is a perspective view illustrating the first terminal 20 as a separate item. FIG. 6B is a perspective view illustrating the second signal terminal 30 as a separate item. FIG. 6C is a perspective view illustrating the reinforcement metal fitting 50 as a separate item. As illustrated in FIG. 6A, the first terminal 20 (the first signal terminal 20A and the power supply terminal 20B) is formed by punching out a metal plate member in the plate thickness direction. the first terminal 20 has a first lower arm 21 elongating in the longitudinal direction, a first upper arm 22 elongating along the longitudinal direction above the first lower arm 21, and a first coupler 23 vertically elongating to couple the middle parts of the first lower arm 21 and the first upper arm 22 to each other. The first upper arm 22 is elastically deformable like a lever using the first coupler 23 as a fulcrum by receiving pressing force by a first shaft 64, described later, of the movable member 60 (see FIG. 8A).

As illustrated in FIG. 5A, the first lower arm 21 elongates in the longitudinal direction along the lower wall 12 of the housing 10. The first lower arm 21 is housed in the first lower groove 17A except the front end side portion. The first lower arm 21 has a first support arm 21A and a first connecting portion 21B located on the front side of the first coupler 23 and a first pressing arm 21C located on the rear side of the first coupler 23. The first support arm 21A elongates along the groove bottom surface of the first lower groove 17A (the lower side inner wall surface). The first support arm 21A has a first support 21A-1 at its front part (also referred to FIG. 8A). the first support 21A-1 is capable of supporting the first shaft 64, described later, of the movable member 60 at the closing position from below. The first connecting portion 21B elongates from the front end of the first support arm 21A to the front side and located outside the housing 10. The lower edge of the first connecting portion 21B is located at almost the same height of the under surface of the lower wall 12. The lower edge of the first connecting portion 21B can surface-contact a power supply circuit (pad) on the mounting surface of the circuit board (not illustrated) for connection with solder. Note that in the first signal terminal 20A, the first connecting portion 21B can surface-contact the first signal circuit (pad) on the mounting surface of the circuit board for connection with solder.

The first pressing arm 21C elongating along the groove bottom surface of the first lower groove 17A. The rear end of the first pressing arm 21C is formed with a first pressing portion 21C-1 projecting upward. The first pressing portion 21C-1 projects from the first lower groove 17A, and is located in the receiver 11. Consequently, the first pressing portion 21C-1 is capable of pressing the ribbon conductor C from below (also referred to FIG. 8A). At a position close to the front end of the first pressing arm 21C (a position close to the first coupler 23), a first held portion 21C-2 projecting upward is formed. The first terminal 20 is formed such that the first terminal 20 is press-fit to the first housing part 17 from the front side, the first held portion 21C-2 bites the first holding portion 17D from below, and the first terminal 20 is held in the housing 10.

The first upper arm 22 has a first pressure-receiving arm 22A located on the front side of the first coupler 23 and a first contact arm 22B located on the rear side of the first coupler 23. The front part of the first pressure-receiving arm 22A elongates from the first upper groove 17B of the housing 10, and is located in the movable member housing space 16. The front part is formed with a first pressure-receiving portion 22A-1 that receives pressing force from below by the first shaft 64, described later, of the movable member 60. As illustrated in FIG. 5A and FIG. 6A, the first pressure-receiving portion 22A-1 has a recess formed on its lower edge that is inward bowed. In this recess, a part of the first shaft 64 of the movable member 60 is housed. The front part and the rear part (a part of the lower edge forming the recess) of the lower edge of the first pressure-receiving portion 22A-1 are capable of retaining the first shaft 64 in the longitudinal direction, thus contributing to the regulation of movement of the movable member 60 in the longitudinal direction. The pressure-receiving portion such as the first pressure-receiving portion 22A-1 receives force from the cam to be elastically deformed upward when the movable member 60 is at the closing position, and the pressure-receiving portion is arranged on the front end side of the upper arm such as the first upper arm 22.

As illustrated in FIG. 5A, the first contact arm 22B elongates along the groove bottom surface of the first upper groove 17B (on the upper side inner wall surface). At the rear end of the first contact arm 22B, a first contacting portion 22B-1 projecting downward is formed. The first contacting portion 22B-1 projects from the first upper groove 17B, and is located in the receiver 11. Consequently, the first contacting portion 22B-1 is capable of contacting the power supply pad C3 of the ribbon conductor C (see FIG. 1) from above with a contact pressure (see FIG. 8A). Note that in the first signal terminal 20A, the first contacting portion 22B-1 is capable of contacting the first signal pad C1 of the ribbon conductor C (see FIG. 1). The first contacting portion 22B-1 clamps the ribbon conductor C in collaboration with the first pressing portion 21C-1 at the time of contacting the ribbon conductor C. In other words, the first contacting portion 22B-1 also functions as a pressing portion that presses the ribbon conductor C from above to increase a contact pressure to the ribbon conductor C. The pressing portion such as the first contacting portion 22B-1 is formed such that the pressing portion is elastically deformed downward corresponding to the elastic deformation of the pressure-receiving portion and presses the ribbon conductor C from above to increase the contact pressure between the ribbon conductor C and the terminals 20 and 30. The pressing portion is arranged on the rear end side of the upper arm such as the first upper arm 22. The first coupler 23 is housed in the first middle groove 17C of the housing 10 on the front side of the first holding portion 17D of the housing 10.

As illustrated in FIG. 6B, the second signal terminal 30 is formed by punching out a metal plate member in the plate thickness direction. The second signal terminal 30 has a second lower arm 31 elongating in the longitudinal direction, a second upper arm 32 elongating along the longitudinal direction above the second lower arm 31, and a second coupler 33. The second coupler 33 vertically elongates, and couples the middle parts of the second lower arm 31 and the second upper arm 32 each other. The second upper arm 32 is elastically deformable like a lever using the second coupler 33 as a fulcrum by receiving pressing force by a second shaft 65, described later, of the movable member 60 (see FIG. 8B).

As illustrated in FIG. 5B, the second lower arm 31 elongates in the longitudinal direction along the lower wall 12 of the housing 10. The second lower arm 31 is housed in the second lower groove 18A except the front-end portion and the rear-end portion. the second lower arm 31 has a second support arm 31A located on the front side of the second coupler 33, and a second connecting portion 31B and a second pressing arm 31C located on the rear side of the second coupler 33. The second support arm 31A elongates along the groove bottom surface (lower side inner wall surface) of the second lower groove 18A. The second support arm 31A has, at its front part, a second support 31A-1 that is capable of supporting the second shaft 65, described later, of the movable member 60 at the closing position from below. At a position close to the rear end of the second support arm 31A (the position close to the second coupler 33), a second held portion 31A-2 projecting upward is formed. The second signal terminal 30 is formed such that the second signal terminal 30 is press-fit to the second housing part 18 from the rear side, the second held portion 31A-2 bites the second holding portion 18D from below, and the second signal terminal 30 is held in the housing 10.

The second pressing arm 31C elongates along the groove bottom surface of the second lower groove 18A. At the rear part of the second pressing arm 31C, a second rear side pressing portion 31C-1 slightly bulging upward is formed. The second rear side pressing portion 31C-1 projects from the second lower groove 18A, and is located in the receiver 11. Consequently, the second rear side pressing portion 31C-1 is capable of pressing the ribbon conductor C from below (see FIG. 8B). at a position close to the front end of the second pressing arm 31C (the position close to the second coupler 33), a second front side pressing portion 31C-2 projecting upward is formed. The second front side pressing portion 31C-2 is provided at almost the same position of the first pressing portion 21C-1 of the first terminal 20 in the longitudinal direction, projects from the second lower groove 18A, and is located in the receiver 11. Consequently, the second front side pressing portion 31C-2 is capable of pressing the ribbon conductor C from below (also referred to FIG. 8B).

The second connecting portion 31B elongates from the rear end of the second pressing arm 31C to the rear side, and is located outside the housing 10. The lower edge of the second connecting portion 31B is located at almost the same height of the under surface of the lower wall 12. The lower edge of the second connecting portion 31B can surface-contact a second signal circuit (pad) on the mounting surface of the circuit board (not illustrated) for connection with solder.

The second upper arm 32 has a second pressure-receiving arm 32A located on the front side of the second coupler 33 and a second contact arm 32B located on the rear side of the second coupler 33. The front part of the second pressure-receiving arm 32A elongates from the second upper groove 18B of the housing 10, and is located in the movable member housing space 16. The front part is formed with a second pressure-receiving portion 32A-1 that receives pressing force from below by the second shaft 65, described later, of the movable member 60.

The second contact arm 32B elongates along the groove bottom surface (upper side inner wall surface) of the second upper groove 18B. The rear end of the second contact arm 32B is located on the rear side of the first contacting portion 22B-1 of the first terminal 20. At the rear end of the second contact arm 32B, a second contacting portion 32B-1 projecting downward is formed. The second contacting portion 32B-1 projects from the second upper groove 18B, and is located in the receiver 11. Consequently, the second contacting portion 32B-1 is capable of contacting the second signal pad C2 of the ribbon conductor C (see FIG. 1) from above with a contact pressure (see FIG. 8B). The second contacting portion 32B-1 clamps the ribbon conductor C in collaboration with the second rear side pressing portion 31C-1 at the time of contacting the ribbon conductor C. In other words, the second contacting portion 32B-1 also functions as a pressing portion to increase a contact pressure to the ribbon conductor C. The second coupler 33 is housed in the second middle groove 18C of the housing 10 on the rear side of the second holding portion 18D of the housing 10.

As illustrated in FIG. 5C, the lock metal fitting 40 has a shape identical to the shape of the second signal terminal 30 described above. The lock metal fitting 40 is disposed at the same position as the second signal terminal 30 when viewed in the connector width direction. The lock metal fitting 40 is formed such that the lock metal fitting 40 is press-fit from the rear side to the second housing part 18, a second held portion 41A-2 bites the second holding portion 18D from below, and the lock metal fitting 40 is held in the housing 10. The lock metal fitting 40 has no function of electrically connecting the ribbon conductor C, whereas the lock metal fitting 40 has a function of suppressing a fall out of the ribbon conductor C by retaining the retained portion C5A of the ribbon conductor C. At this point, the lock metal fitting 40 is different from the second signal terminal 30. In the lock metal fitting 40, the portion corresponding to the second contact arm 32B of the second signal terminal 30 forms a lock arm 42B capable of elastically deforming in the vertical direction. The portion corresponding to the second contacting portion 32B-1 of the second contact arm 32B in the lock arm 42B forms a lock portion 42B-1 that is a retainer capable of retaining the retained portion C5A of the ribbon conductor C from the rear side (also referred to FIG. 8C).

The portion corresponding to the second connecting portion 31B of the second signal terminal 30 in the lock metal fitting 40 forms a fixing portion 41B fixed to the mounting surface of the circuit board by connection with solder. At this time, the portion where the fixing portion 41B is connected with solder in the circuit board is a fixing pad, not the circuit. The lock metal fitting 40 has the function similar to the corresponding portion of the second signal terminal 30 except the lock arm 42B and the fixing portion 41B. Consequently, in the drawings, in the portions except the lock arm 42B and the fixing portion 41B of the lock metal fitting 40, a reference sign adding "10" is denoted to the reference signs of the corresponding portions of the second signal terminal 30, and the description is omitted.

In the present embodiment, the lock metal fitting 40 is formed in the same shape as the second signal terminal 30, and thus it is possible to use the second signal terminal 30 that is fabricated as the lock metal fitting 40 with no change. Consequently, the separate preparation of the lock metal fitting in a shape different from the second signal terminal 30 is eliminated. Accordingly, it is possible to simplify the fabrication of the connector 1, and it is possible to suppress fabrication costs.

As illustrated in FIG. 6C, the reinforcement metal fitting 50 is formed by punching out a metal plate member in the plate thickness direction. The reinforcement metal fitting 50 has a held portion 51 held in the housing 10, an elongating portion 52 elongating from the held portion 51 to the front side, a regulating portion 53 elongating downward from the front part of the elongating portion 52, a fixing portion 54 located below from the regulating portion 53 and fixed to the circuit board, and a third contact arm (arm) 55 elongating rearward from the held portion 51. The third contact arm 55 is formed such that the third contact arm 55 is capable of elasticity deforming in the vertical direction to press the ribbon conductor C from above. The third contact arm 55 is formed contactable to the circuit of the ribbon conductor C. The held portion 51 is held in the housing 10 on the front end side of the housing 10. The elongating portion 52 elongates from the held portion 51 to the front side, and elongates outside the housing 10. In the present embodiment, the reinforcement metal fitting 50 functions as a power supply terminal. As described above, in the present embodiment, the reinforcement metal fitting 50 is used as the power supply terminal, and this enables carrying a larger power supply current without increasing the number of the power supply terminals 20B.

As illustrated in FIG. 6C, the held portion 51 has a plurality of projections 51A projecting from its upper edge. As illustrated in FIG. 5D, the reinforcement metal fitting 50 is formed such that the reinforcement metal fitting 50 is press-fit to the third housing part 19 from the front side, the projection 51A bites the upper side inner wall surface of the front hole 19A, and the reinforcement metal fitting 50 is held in the housing 10. The elongating portion 52 elongates outside the housing 10, and is located in the movable member housing space 16. The regulating portion 53 linearly elongates in the vertical direction. The front end surface of the regulating portion 53 forms a flat surface at the right angle to the longitudinal direction. The front end surface of the regulating portion 53 is capable of contacting a regulated portion 61A, described later, as opposed to the regulated portion 61A of the movable member 60 at the closing position from the rear side.

The lower edge of the fixing portion 54 is located at almost the same height of the under surface of the lower wall 12, and can surface-contact the power supply circuit (pad) of the mounting surface of the circuit board (not illustrated) for connection with solder. In the present embodiment, the fixing portion 54 is adjacent to the first connecting portion 21B of the outer power supply terminal 20B. Therefore, when the connector 1 is mounted on the circuit board, the fixing portion 54 can be connected, with solder, to the pad shared by the power supply terminal 20B of the power supply terminal group.

The third contact arm 55 elongates along the groove bottom surface of the third upper groove 19B (the upper side inner wall surface) to almost the same position as the rear end of the first contact arm 22B of the first terminal 20. At the rear end of the third contact arm 55, a third contacting portion 55A projecting downward is formed. The rear end of the third upper groove 19B is located right below the upper opening 13A of the upper wall 13. Consequently, the rear end of the third upper groove 19B is capable of entering the upper opening 13A from below when the third contact arm 55 is elastically deformed upward (see FIG. 7D and FIG. 8D). In the present embodiment, the third contacting portion 55A is adjacent to the first contacting portion 22B-1 of the outer power supply terminal 20B. Therefore, when the ribbon conductor C is connected to the connector 1, the third contacting portion 55A can be contacted with the power supply pad C3 shared by the power supply terminal 20B of the power supply terminal group (see FIG. 4B).

As illustrated in FIG. 1, FIG. 2, and FIGS. 4A and 4B, the movable member 60 elongates across nearly the entire width of the movable member housing space 16 in the connector width direction. As illustrated in FIG. 1, in a state in which the movable member 60 is at the opening position, the lower part of the movable member 60 is housed in the movable member housing space 16. As illustrated in FIG. 2, in a state in which the movable member 60 is at the closing position, the movable member 60 is entirely housed in the movable member housing space 16. As illustrated in FIG. 3, the movable member 60 has an operating portion 61, as a main body, elongating in the terminal arrangement direction, an end wall 62, a partition wall 63, the first shaft 64 (see FIG. 5A), the second shaft 65 (see FIGS. 5B and 5C), and the third shaft 66 (see FIG. 5D).

Figure 8A:
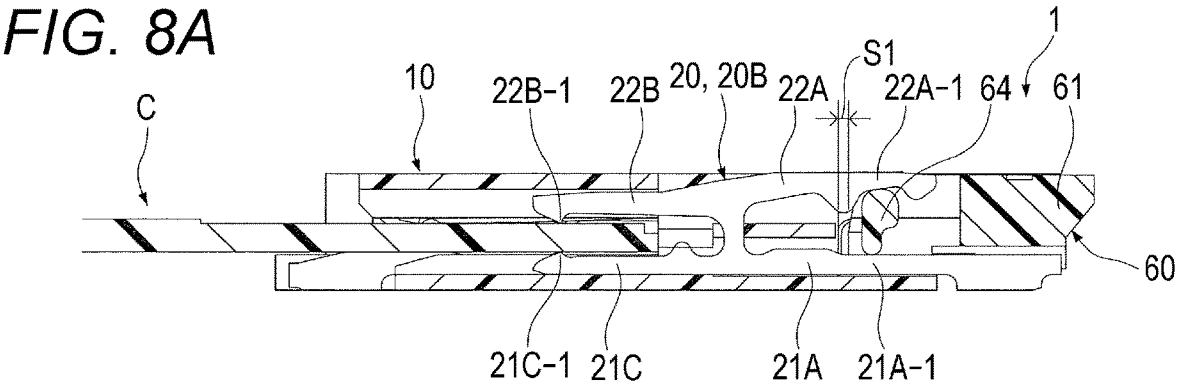
FIGS. 8A to 8D are longitudinal cross-sectional views illustrating the ribbon conductor connector after the connection of the ribbon conductor is completed.
Figure 8B:
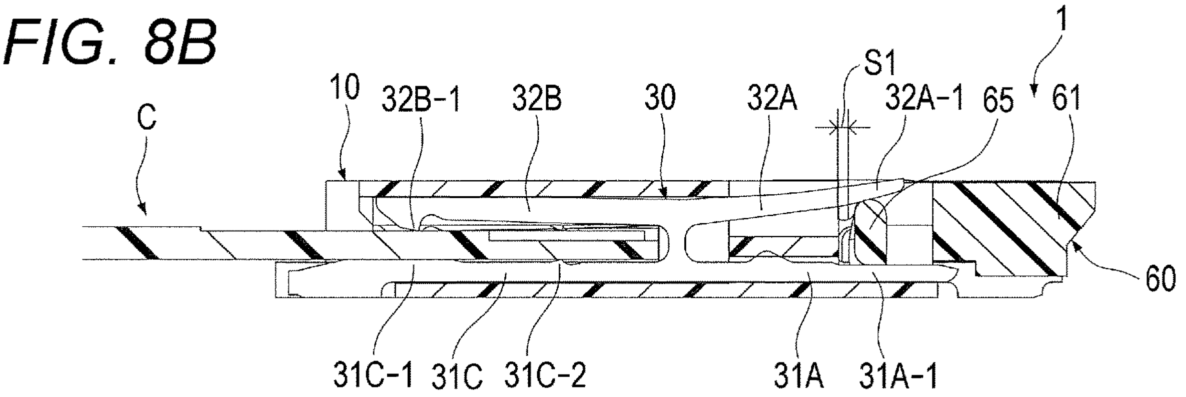

As illustrated in FIG. 3, the operating portion 61 is formed elongating in the connector width direction on the top end side of the movable member 60. The operating portion 61 is formed so as to receive the operation of moving (rotating) the movable member 60 between the opening position and the closing position. The operating portion 61 has the regulated portion 61A projecting outward in the connector width direction from both side surfaces of the upper-end portion of the operating portion 61. The regulated portion 61A is located corresponding to the reinforcement metal fitting 50 in the connector width direction. As illustrated in FIG. 8D, the regulated portion 61A is located on the front side of the regulating portion 53 of the reinforcement metal fitting 50 in the state in which the movable member 60 is at the closing position. When the movable member 60 is at the closing position, the regulated portion 61A is located such that the regulated portion 61A is contactable to the regulating portion 53, facing from the front. In the state in which the movable member 60 is at the closing position, the rear end surface of the regulated portion 61A opposed to the regulating portion 53 forms a flat surface at the right angle to the longitudinal direction. That is, the surfaces of the regulating portion 53 and the regulated portion 61A facing each other form flat surfaces at the right angle to the longitudinal direction. Note that the right angle includes not only strict right angles as well as right angles such as substantial right angles and nearly right angles.

In the present embodiment, as illustrated in FIG. 8D, when the movable member 60 is at the closing position, a gap S2 is smaller than a gap S1. This gap S2 is formed between the front end of the regulating portion 53 of the reinforcement metal fitting 50 and the rear end of the regulated portion 61A of the movable member 60 in the longitudinal direction. The gap S1 is formed between the rear end of the movable member 60 and the front end of the front wall 15 of the housing 10 in the longitudinal direction.

As illustrated in FIG. 3, the end wall 62 is provided elongating downward from both end portions of the operating portion 61 in the connector width direction. As illustrated in FIG. 3, a plurality of partition walls 63 is formed such that the plurality of partition walls 63 elongates downward from the operating portion 61 between two end walls 62 in the connector width direction, and arranged spaced with gaps in the connector width direction.

As illustrated in FIG. 5A, the first shaft 64 is provided at the same position as the first terminal 20 in the connector width direction. The first shaft 64 couples the opposed surfaces of the lower-end portions of two adjacent partition wall 63 (surfaces at a right angle to the connector width direction). As illustrated in FIG. 5A, in the first shaft 64, the cross-sectional shape at a right angle to the connector width direction has a shape in which a front, upper corner is cut from a near ellipse elongating in the longitudinal direction. As illustrated in FIG. 5A, the first shaft 64 is located between the first support 21A-1 and the first pressure-receiving portion 22A-1 of the first terminal 20 in the vertical direction. At this time, the first shaft 64 is located spaced with a slight gap to the upper edge of the first support 21A-1, and contacts the lower edge of the first pressure-receiving portion 22A-1. As described later, the first shaft 64 functions as a cam that pushes up the first pressure-receiving portion 22A-1 to deform the first pressure-receiving arm 22A upward when the movable member 60 moves to the closing position (see FIG. 8A). This cam is located corresponding to the terminals 20 and 30 in the terminal arrangement direction, and collaborates with the terminals 20 and 30.

As illustrated in FIG. 5B and FIG. 5C, the second shaft 65 is provided at the same position as the second signal terminal 30 and the lock metal fitting 40 in the connector width direction. The second shaft 65 couples the opposed surfaces of the lower-end portions of the adjacent partition walls 63. As illustrated in FIG. 5B and FIG. 5C, a cross-sectional shape at a right angle to the connector width direction in the second shaft 65 is in a near ellipse elongating in the longitudinal direction. As illustrated in FIG. 5B, the second shaft 65 at the position of the second signal terminal 30 is located between the second support 31A-1 and the second pressure-receiving portion 32A-1 of the second signal terminal 30 in the vertical direction. At this time, the second shaft 65 is supported on the upper edge of the second support 31A-1, and is located spaced with a slight gap to the lower edge of the second pressure-receiving portion 32A-1. As described later, the second shaft 65 functions as a cam that pushes up the second pressure-receiving portion 32A-1 to deform the second pressure-receiving arm 32A upward when the movable member 60 moves to the closing position (see FIG. 8B). The same thing applies to the second shaft 65 at the position of the lock metal fitting 40 (see FIG. 5C and FIG. 8C).

As illustrated in FIG. 5D, the third shaft 66 is provided at the same position as the reinforcement metal fitting 50 in the connector width direction. As illustrated in FIG. 3, the third shaft 66 projects outward from the lower-end portion of the end wall 62 in the connector width direction. As illustrated in FIG. 5D, a cross-sectional shape at a right angle to the connector width direction in the third shaft 66 is in a near ellipse slightly shorter than the second shaft 65 in the longitudinal direction. the third shaft 66 slightly projects forward and downward from the lower-end portion of the movable member 60.

As illustrated in FIG. 5D, the third shaft 66 is housed in the recess 16A of the housing 10, and is located below the elongating portion 52 of the reinforcement metal fitting 50 and on the rear side of the regulating portion 53. At this time, the third shaft 66 does not contact any of the inner surface of the recess 16A, the lower edge of the elongating portion 52, and the rear edge of the regulating portion 53. The third shaft 66 is in a state in which the third shaft 66 is surrounded by the inner surface of the recess 16A of the housing 10 and the elongating portion 52 and the regulating portion 53 of the reinforcement metal fitting 50, when viewed in the connector width direction. Therefore, the inner surface of the recess 16A, the elongating portion 52, and the regulating portion 53 regulate the movement of the third shaft 66 in the vertical direction and the longitudinal direction. Consequently, it is possible to excellently suppress the unprepared removal of the movable member 60 from the housing 10.

The connector 1 is assembled by the following manner. First, the first terminal 20, i.e., the first signal terminal 20A and the power supply terminal 20B are mounted by press-fitting to the first housing part 17 of the housing 10 from the front side. the second signal terminal 30 and the lock metal fitting 40 are mounted by press-fitting to the second housing part 18 of the housing 10 from the rear side. Here, the order of mounting the first signal terminal 20A, the power supply terminal 20B, the second signal terminal 30, and the lock metal fitting 40 on the housing 10 are any orders, mounting may be performed simultaneously.

Subsequently, the movable member 60 remains in the attitude at the opening position (see FIG. 3), the lower part of the movable member 60 is disposed in the movable member housing space 16 of the housing 10. At this time, the third shaft 66 of the movable member 60 is disposed in the recess 16A of the housing 10. Subsequently, the reinforcement metal fitting 50 is mounted by press-fitting to the third housing part 19 of the housing 10 from the front side. As a result, as illustrated in FIG. 5D, the third shaft 66 is in a state in which is surrounded from four sides by the inner surface of the recess 16A of the housing 10 and the elongating portion 52 and the regulating portion 53 of the reinforcement metal fitting 50. Thus, the removal of the movable member 60 from the housing 10 is suppressed. As described above, the movable member 60 is mounted on the housing 10 in the state in which the movable member 60 is movable between the opening position and the closing position, and thus the connector 1 is completed. Note that the disposition of the lower part of the movable member 60 in the movable member housing space 16 is performed at any time as long as after the first signal terminal 20A and the power supply terminal 20B are mounted and before the reinforcement metal fitting 50 is mounted.

Subsequently, the operation of insertion and removal of the ribbon conductor C to the connector 1 will be described. First, the first connecting portion 21B of the first signal terminal 20A of the connector 1, the first connecting portion 21B of the power supply terminal 20B, and the second connecting portion 31B of the second signal terminal 30 are connected with solder to the corresponding circuits of the circuit board (not illustrated). The fixing portion 41B of the lock metal fitting 40, and the fixing portion 54 of the reinforcement metal fitting 50 are connected with solder to the corresponding parts of the circuit board. By the connection with solder of the first connecting portion 21B, the second connecting portion 31B, the fixing portion 41B, and the fixing portion 54, the connector 1 is mounted on the circuit board.

In the present embodiment, as illustrated in FIG. 4A, the second signal terminal 30 is disposed outside the arrangement region of the power supply terminal group. In other words, in the arrangement region of the power supply terminals 20B belonging to the power supply terminal group, no second signal terminal 30 is disposed. Therefore, the first connecting portions 21B of the power supply terminals 20B belonging to the power supply terminal group are brought close to each other in the connector width direction, and thus these first connecting portions 21B can be connected with solder to the same power supply circuit (pad) of the circuit board in a shared manner. As a result, it is possible to suppress an increase in the size of the connector 1 in the connector width direction. The first connecting portions 21B of the power supply terminals 20B are not connected to separate pads. Consequently, it is unnecessary to form conductive patterns that connect the separate pads on the circuit board. Therefore, it is possible to suppress excess heating on the circuit board.

In the present embodiment, as illustrated in FIG. 4A, the fixing portion 54 of the reinforcement metal fitting 50 functioning as the power supply terminal is adjacent to the first connecting portion 21B of the outer power supply terminal 20B belonging to the power supply terminal group. Therefore, it is possible to connect, with solder, the fixing portion 54 of the reinforcement metal fitting 50 to the first connecting portion 21B of the power supply terminal 20B of the power supply terminal group on the shared pad.

As illustrated in FIG. 1, FIGS. 4A, and FIGS. 5A to 5D, when the ribbon conductor C is connected to the connector 1, the ribbon conductor C is disposed so as to elongate in the longitudinal direction (the X-axis direction) on the rear side of the connector 1 in the state in which the movable member 60 is moved to the opening position.

Subsequently, the ribbon conductor C is inserted into the receiver 11 of the connector 1 forward (in the X1 direction). In the process of insertion of the ribbon conductor C to the receiver 11, the front end of the ribbon conductor C first contacts the second portion 32B-1 of the second signal terminal 30 (see FIG. 5B) and the lock portion 42B-1 of the lock metal fitting 40, and pushes up the second contacting portion 32B-1 and the lock portion 42B-1. Thus, the second contact arm 32B and the lock arm 42B are elastically deformed upward.

Figure 7A:
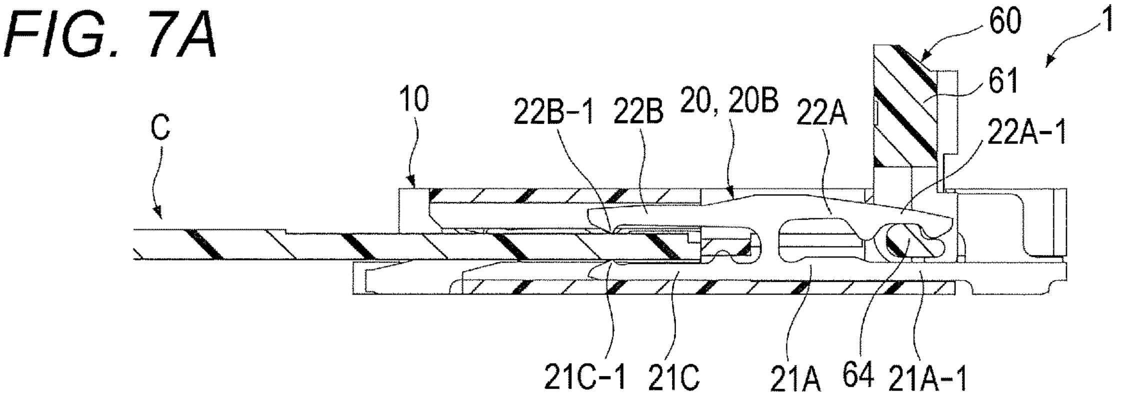
FIGS. 7A to 7D are longitudinal cross-sectional views of the ribbon conductor connector after the ribbon conductor is inserted.
Figure 7B:
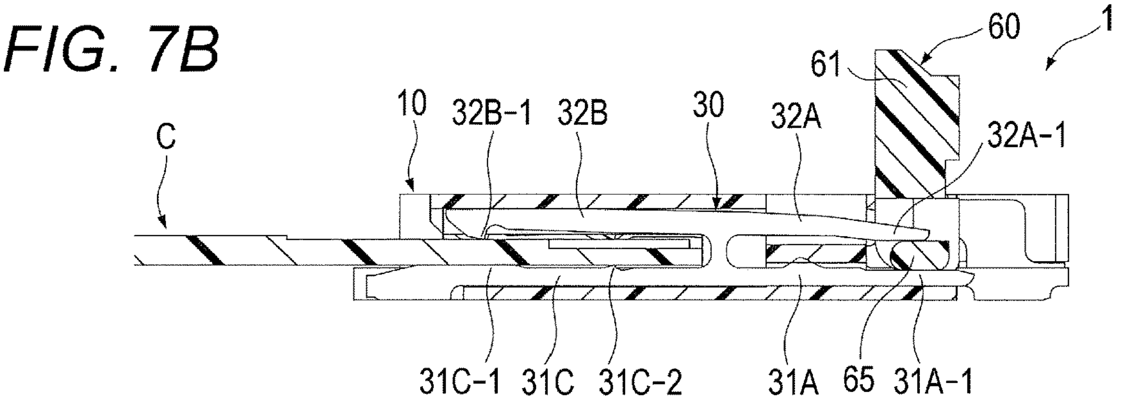
Figure 7C:
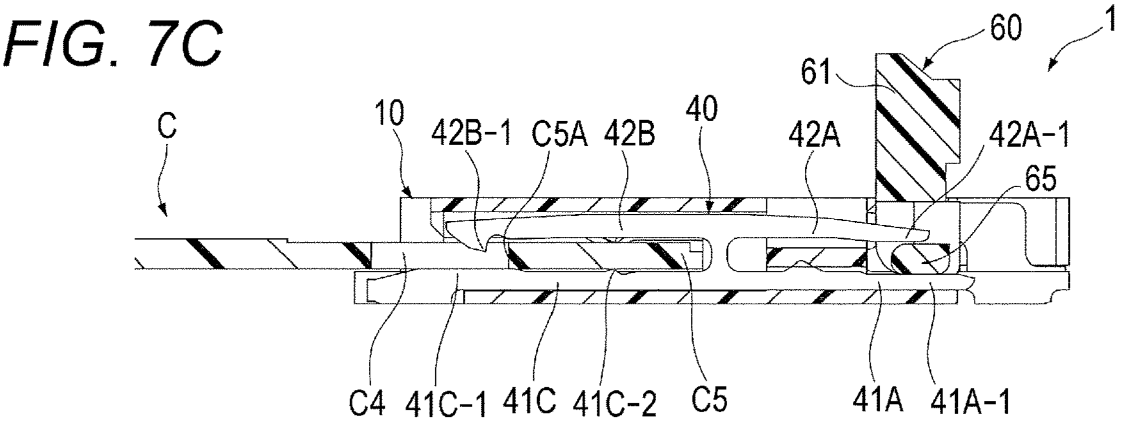
Figure 7D:
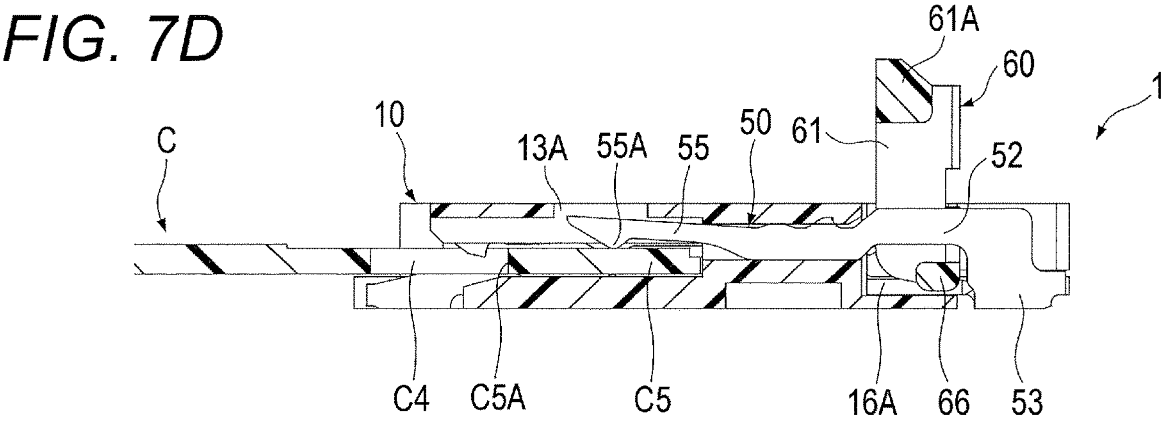

After the ribbon conductor C is further inserted to the front side, the front end of the ribbon conductor C contacts the first contacting portion 22B-1 of the first terminal 20 and the third contacting portion 55A of the reinforcement metal fitting 50, and pushes up the first contacting portion 22B-1 and the third contacting portion 55A. Thus, the first contact arm 22B and the third contact arm 55 are elastically deformed upward. As illustrated in FIG. 4B and FIGS. 7A to 7D, the ribbon conductor C is further inserted to the front side, its front end contacts the front wall 15 from the rear side, and thus the insertion of the ribbon conductor C is completed. As illustrated in FIG. 7A, FIG. 7B, and FIG. 7D, also in the state in which the insertion of the ribbon conductor C is completed, the first contact arm 22B, the second contact arm 32B, and the third contact arm 55 remain elastically deformed, and the first contacting portion 22B-1, the second contacting portion 32B-1, and the third contacting portion 55A contact the first signal pad C1, the second signal pad C2, or the power supply pad C3 of the ribbon conductor C.

In regard to the lock metal fitting 40, in the process of the insertion of the ribbon conductor C, after the lock arm 42B is elastically deformed upward, the tab C5 of the ribbon conductor C passes the position of the lock portion 42B-1, and then the lock arm 42B returns to a free state, and enters into the notch C4 of the ribbon conductor C from above. As a result, as illustrated in FIG. 7C, in the state in which the insertion of the ribbon conductor C is completed, the lock portion 42B-1 is located opposed to the retained portion C5A of the ribbon conductor C from the rear side. Note that the lock arm 42B does not necessarily have to completely return to the free state. For example, the lock metal fitting 40 may be formed such that the lock arm 42B enters into the notch C4 of the ribbon conductor C in a state in which the lock arm 42B is slightly elastically deformed.

Subsequently, the operating portion 61 of the movable member 60 is operated with a finger to move (rotate) the movable member 60 from the opening position to the closing position. As illustrated in FIGS. 8A to 8D, after the movable member 60 is moved to the closing position, the first shaft 64, the second shaft 65, and the third shaft 66 are in an elongating attitude as the vertical direction is the longitudinal direction. At this time, the first shaft 64 and the second shaft 65 located respectively corresponding to the first terminal 20 and the second signal terminal 30 press the first pressure-receiving portion 22A-1 and the second pressure-receiving portion 32A-1 from below as the first shaft 64 and the second shaft 65 are in a state of being respectively supported by the first support 21A-1 and the second support 31A-1 from below, and the first pressure-receiving arm 22A and the second pressure-receiving arm 32A are deformed upward. As a result, as illustrated in FIG. 8A and FIG. 8B, the first upper arm 22 and the second upper arm 32 are deformed in a lever, and the first contact arm 22B and the second contact arm 32B are deformed downward. The first contacting portion 22B-1 and the second contacting portion 32B-1 contact the first signal pad C1, the second signal pad C2, or the power supply pad C3 of the ribbon conductor C from above in a state in which the contact pressure is increased (also referred to FIG. 4B). Thus, a state in which the first terminal 20, the second signal terminal 30, and the ribbon conductor C electrically conduct each other is maintained.

Figure 8C:
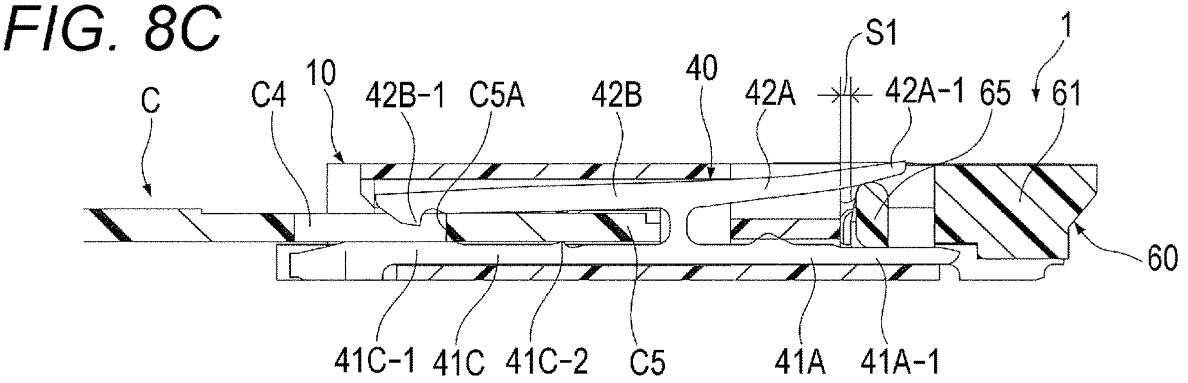
Figure 8D:
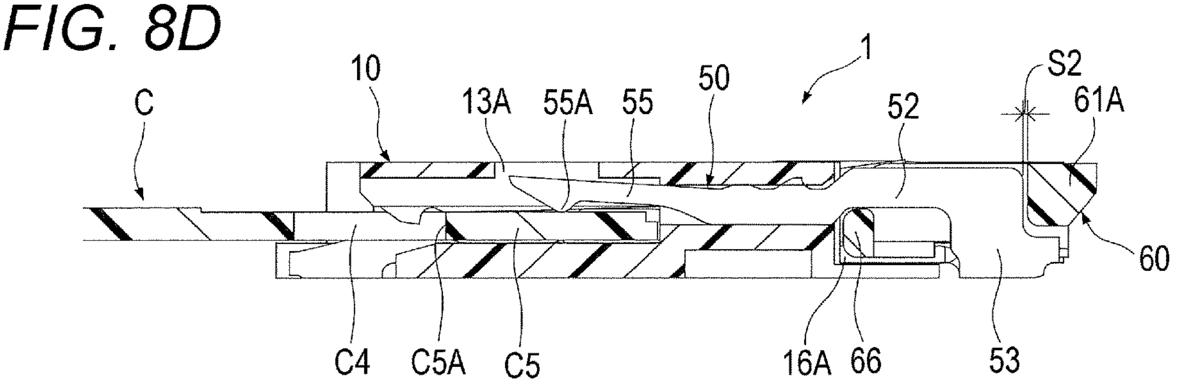

As illustrated in FIG. 8C, after the movable member 60 is moved to the closing position, the second shaft 65 located corresponding to the lock metal fitting 40 presses the second pressure-receiving portion 42A-1 from below, and deforms the second pressure-receiving arm 42A upward. As a result, the second upper arm 42 is deformed in a lever, the lock arm 42B is deformed downward, and the lock portion 42B-1 further enters deep into the notch C4 of the ribbon conductor C. Therefore, a state in which the lock portion 42B-1 is capable of retaining the retained portion C5A from the rear side is maintained, and the pull out of the ribbon conductor C to the rear side is excellently suppressed.

As illustrated in FIG. 8D, when the movable member 60 moves to the closing position, the third shaft 66 located corresponding to the reinforcement metal fitting 50 does not contact the reinforcement metal fitting 50 even in a vertically elongating attitude. After the movable member 60 moves to the closing position, a state in which the third contact arm 55 is elastically deformed and contacts the power supply pad C3 with the third contacting portion 55A is maintained, and a state in which the third contact arm 55 and the power supply pad C3 electrically conduct to each other is maintained. As described above, the movable member 60 is moved to the closing position, and thus the connection operation of the ribbon conductor C to the connector 1 is completed.

As illustrated in FIGS. 8A to 8C, in the state in which the movable member 60 is at the closing position, the gap S1 is formed between the rear end of the movable member 60 and the front end of the front wall 15 of the housing 10. As illustrated in FIG. 8D, the regulated portion 61A of the movable member 60 is located on the front side of the regulating portion 53 in the state in which the gap S2 is formed between the regulated portion 61A and the front end of the regulating portion 53 of the reinforcement metal fitting 50. In the present embodiment, the gap S2 is smaller than the gap S1. Therefore, supposing that when unprepared external force acts on the movable member 60 at the closing position from the front side, the regulated portion 61A contacts from the front to the regulating portion 53 before the rear end of the movable member 60 contacts from the front to the front wall 15. Consequently, the movement of the regulated portion 61A toward the rear side is regulated.

supposing that in the case in which the regulated portion 61A is not provided on the movable member 60, when unprepared external force acts on the movable member 60 at the closing position from the front side, the movable member 60 moves on a distance of the gap S2 (here, referred to as "a distance S2") on the rear side until the rear end of the movable member 60 contacts the front wall 15 of the housing 10. At this time, the first shaft 64, the second shaft 65, and the third shaft 66 of the movable member 60 also move on the distance S2. As a result, the first shaft 64 located corresponding to the first terminal 20, the second shaft 65 located corresponding to the second signal terminal 30, and the second shaft 65 located corresponding to the lock metal fitting 40 further push up the first pressure-receiving arm 22A of the first terminal 20, the second pressure-receiving arm 32A of the second signal terminal 30, and the second pressure-receiving arm 32A of the lock metal fitting 40, which are already in the deformed state. Therefore, there is a possibility that the first pressure-receiving arm 22A and the second pressure-receiving arm 32A are excessively, resulting in the breakage of the first terminal 20, the second signal terminal 30, and the lock metal fitting 40.

On the other hand, in the present embodiment, the regulated portion 61A of the movable member 60 is located on the front side of the regulating portion 53 in the state in which the gap S2 smaller than the gap S1 is formed in the longitudinal direction to the regulating portion 53 of the reinforcement metal fitting 50. Therefore, at the time point at which the movable member 60 that receives external force on the rear side is moved to the rear side by the distance S2, the regulated portion 61A contacts from the front to the regulating portion 53. Consequently, the movable member 60 is regulated not to move further. Therefore, the movement of the movable member 60 is restricted at the minimum. Consequently, it is possible to suppress an event that the first pressure-receiving arm 22A of the first terminal 20, the second pressure-receiving arm 32A of the second signal terminal 30, and the second pressure-receiving arm 32A of the lock metal fitting 40 are excessively pushed up and deformed by the first shaft 64 of the movable member 60 and the second shaft 65. As a result, the breakage of the first terminal 20, the second signal terminal 30, and the lock metal fitting 40 is excellently suppressed.

In the present embodiment, the front end surface of the regulating portion 53 and the rear end surface of the regulated portion 61A, i.e., the surfaces of the regulating portion 53 and the regulated portion 61A facing each other form a flat surface at the right angle to the longitudinal direction. Therefore, when the movable member 60 receives external force from the front side and moves on the rear side, the flat surfaces of the regulating portion 53 and the regulated portion 61A surface-contact each other. As a result, the regulating portion 53 and the regulated portion 61A can contact each other in a larger area. Thus, it is possible to more excellently suppress a fall out of the ribbon conductor C.

In the present embodiment, the regulating portion 53 of the reinforcement metal fitting 50 is provided on the front side of the held portion 51 held and fixed to the housing 10, i.e., the regulating portion 53 is provided on the opposite side of the third contact arm 55 in the longitudinal direction. Therefore, even though the regulated portion 61A of the movable member 60 that moves on the rear side contacts from the front to the regulating portion 53, the elastically deformed state of the third contact arm 55 is hardly affected. As a result, it is possible to excellently maintain the contact state of the third contacting portion 55A with the power supply pad C3 of the ribbon conductor C.

The ribbon conductor C in the state illustrated in FIGS. 8A to 8D, i.e., the ribbon conductor C is connected to the connector 1 is intentionally pulled out of the connector 1, the operating portion 61 of the movable member 60 at the closing position is operated to move the movable member 60 to the opening position illustrated in FIGS. 7A to 7D. Consequently, the lock portion 42B-1 of the lock metal fitting 40 is removed upward from the notch C4 of the ribbon conductor C. As a result, the retainment state of the lock portion 42B-1 on the retained portion C5A is released, and the pull out of the ribbon conductor C is permitted. The ribbon conductor C is pulled on the rear side (in the X2 direction), the ribbon conductor C is smoothly pulled out of the connector 1, and the pull-out operation is completed.

In the present embodiment, the reinforcement metal fitting is used as the power supply terminal. Instead of this, the reinforcement metal fitting may be used as the signal terminal. In this case, the ribbon conductor is provided with a signal pad at a position corresponding to the reinforcement metal fitting in the connector width direction. The reinforcement metal fitting does not necessarily have to use as the terminal. In the case in which the reinforcement metal fitting does not use as the terminal, it is unnecessary to provide the contact arm on the reinforcement metal fitting.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A ribbon conductor connector comprising:

a housing formed with a receiver as a space opened rearward, the receiver being capable of receiving a ribbon conductor in a ribbon shape, the ribbon conductor being insertably and pullably connected to the ribbon conductor connector in a longitudinal direction;

a plurality of terminals arranged in a width direction of the ribbon conductor as a terminal arrangement direction, the plurality of terminals being held in the housing;

a reinforcement metal fitting disposed outside a terminal arrangement region in the terminal arrangement direction, the reinforcement metal fitting being held in the housing; and a movable member movable with rotation between an opening position at which insertion of the ribbon conductor to the receiver is permitted and a closing position at which a contact pressure of the terminal to the ribbon conductor is increased, wherein the housing permits movement of the movable member on a front side of the receiver, the movable member has a main body elongating in the terminal arrangement direction, a cam located corresponding to the terminal in the terminal arrangement direction, and a shaft at a position corresponding to the reinforcement metal fitting in the terminal arrangement direction, the cam being in collaboration with the terminal, the plurality of terminals has an upper arm and a lower arm elongating along the longitudinal direction and a coupler that couples middle parts of the upper arm and the lower arm in the longitudinal direction, the upper arm has, on a front end side, a pressure-receiving portion that is capable of elastically deforming upward by receiving force from the cam when the movable member is at the closing position, and the upper arm has, on a rear end side, a pressing portion that is elastically deformed downward corresponding to elastic deformation of the pressure-receiving portion, the pressing portion pressing the ribbon conductor from above to increase a contact pressure of the ribbon conductor with the terminal, the reinforcement metal fitting has a held portion that is held on the housing on a front end side of the housing, the reinforcement metal fitting has an elongating portion elongating from the held portion to a front side, the elongating portion elongating outside the housing, the reinforcement metal fitting has a regulating portion located on a front side of the shaft, and the reinforcement metal fitting has a fixing portion located below from the regulating portion, the fixing portion being fixed to a circuit board, the main body has a regulated portion located corresponding to the reinforcement metal fitting in the terminal arrangement direction, the regulated portion is located so as to be contactable to the regulating portion facing from front in a state in which a first gap is formed between the regulated portion and the regulating portion when the movable member is at the closing position, and the movable member is configured to be moved to a rear side in the longitudinal direction by a distance of the first gap when the movable member receives external force on the rear side.

2. The ribbon conductor connector according to claim 1, wherein a recess opened upward and forward is formed at a position corresponding to the reinforcement metal fitting in the terminal arrangement direction in a front part of the housing, the shaft is housed in the recess and is surrounded by an inner surface of the recess, the elongating portion and the regulating portion when viewed in the terminal arrangement direction.

3. The ribbon conductor connector according to claim 1, wherein surfaces of the regulating portion and the regulated portion facing each other form flat surfaces.

4. The ribbon conductor connector according to claim 1, wherein the reinforcement metal fitting has an arm elongating from the held portion to a rear side, the arm is formed such that the arm is elastically vertically deformed to be able to press a circuit of the ribbon conductor from above, and the arm is electrically connected with the circuit of the ribbon conductor in a state where the arm is elastically vertically deformed toward the circuit of the ribbon conductor.

5. The ribbon conductor connector according to claim 1, wherein the housing includes a front wall including a front end which faces a rear end of the movable member when the movable member is at the closing position, a second gap is formed between the front end of the front wall and the rear end of the movable member in the longitudinal direction when the movable member is at the closing position, the first gap is formed between a front end of the regulating portion of the reinforcement metal fitting and a rear end of the regulated portion of the movable member in the longitudinal direction when the movable member is at the closing position, and the first gap is smaller than the second gap.

6. The ribbon conductor connector according to claim 1, wherein the regulating portion elongates in a vertical direction from the elongating portion.

7. The ribbon conductor connector according to claim 1, wherein the elongating portion regulates movement of the shaft in a vertical direction, and the regulating portion regulates the movement of the shaft in the longitudinal direction.

8. The ribbon conductor connector according to claim 1, wherein surfaces of the regulating portion and the regulated portion facing each other form flat surfaces at a right angle in the longitudinal direction.

9. The ribbon conductor connector according to claim 1, wherein the reinforcement metal fitting has an arm elongating from the held portion to a rear side, and the arm is formed such that the arm is elastically vertically deformed to be able to press the ribbon conductor from above.

10. The ribbon conductor connector according to claim 8, wherein the reinforcement metal fitting has an arm elongating from the held portion to a rear side, and the arm is formed such that the arm is elastically vertically deformed to be able to press the ribbon conductor from above.

11. The ribbon conductor connector according to claim 9, wherein the arm is formed such that the arm is contactable with a circuit of the ribbon conductor.

12. The ribbon conductor connector according to claim 10, wherein the arm is formed such that the arm is contactable with a circuit of the ribbon conductor.

* * * * *